ововov
United States Patent
Sampath et al.

(12) United States Patent
(10) Patent No.: US 7,548,752 B2
(45) Date of Patent: Jun. 16, 2009

(54) FEEDBACK TO SUPPORT RESTRICTIVE REUSE

(75) Inventors: Hemanth Sampath, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 305 days.

(21) Appl. No.: 11/020,707

(22) Filed: Dec. 22, 2004

(65) Prior Publication Data
US 2006/0135169 A1 Jun. 22, 2006

(51) Int. Cl.
*H04Q 7/20* (2006.01)
(52) U.S. Cl. ............... 455/447; 455/450; 370/468; 370/208; 370/229; 370/241; 370/329; 370/338; 370/341
(58) Field of Classification Search ........... 455/450, 455/447; 320/335, 252; 370/329, 338, 341, 370/468, 208, 229, 241
See application file for complete search history.

(56) References Cited

U.S. PATENT DOCUMENTS

| | | | |
|---|---|---|---|
| 4,639,914 A | 1/1987 | Winters | |
| 5,210,771 A | 5/1993 | Schaeffer | |
| 5,355,522 A | 10/1994 | Demange | |
| 5,497,505 A | 3/1996 | Koohogili et al. | |
| 5,649,292 A | 7/1997 | Doner et al. | |
| 5,726,978 A | 3/1998 | Frodigh et al. | 370/252 |
| 5,839,074 A | 11/1998 | Plehn et al. | |
| 5,852,780 A | 12/1998 | Wang et al. | |
| 5,884,145 A | 3/1999 | Haartsen | |
| 5,937,002 A | 8/1999 | Andersson et al. | |
| 6,035,000 A | 3/2000 | Bingham | |
| 6,112,094 A | 8/2000 | Dent | |

(Continued)

FOREIGN PATENT DOCUMENTS

EP 1178641 2/2002

(Continued)

OTHER PUBLICATIONS

Zhang et al, "Enhanced Feedback Method for Enhanced Fast-Feedback Channels", IEEE 802.16 Broadband Wireless Access Working Group, [Online] (Nov. 15, 2004), pp. 0-9.

(Continued)

*Primary Examiner*—David Q Nguyen
(74) *Attorney, Agent, or Firm*—Sandip S. Minhas; Milan I. Patel

(57) ABSTRACT

The scheduler in a base station needs CQI information from a terminal for all reuse sets every 5 ms. to decide on which re-use set to schedule a given terminal. For MIMO users, the problem is that the CQI cannot be reconstructed for all re-use sets, using the current design. Solution: (1) For Multiple Code Word MIMO users, a MIMO VCQI connection layer message enables the base station to reconstruct the MIMO-CQI for all reuse sets on a packet-by-packet basis. This will enable dynamic scheduling (RESTRICTIVE REUSE) gains. (2) For Single Code Word users, dynamic RESTRICTIVE REUSE can be obtained by changing the CQI reporting format, and also sending a MIMO-VCQI connection layer message. (3) For Single Code Word design, quasi-static scheduling gains can be obtained by sending a MIMO-VCQI connection layer message.

14 Claims, 16 Drawing Sheets

U.S. PATENT DOCUMENTS

| | | | |
|---|---|---|---|
| 6,356,531 | B1 | 3/2002 | Soliman |
| 6,385,457 | B1 | 5/2002 | Dam et al. |
| 6,400,697 | B1 | 6/2002 | Leung et al. |
| 6,493,331 | B1 | 12/2002 | Walton et al. |
| 6,512,752 | B1 | 1/2003 | H'mimy et al. |
| 6,549,784 | B1 | 4/2003 | Kostic et al. |
| 6,553,234 | B1 * | 4/2003 | Florea .................. 455/447 |
| 6,591,106 | B1 | 7/2003 | Zirwas |
| 6,606,496 | B1 | 8/2003 | Salvarani et al. |
| 6,704,572 | B1 | 3/2004 | Whinnett et al. |
| 6,744,743 | B2 | 6/2004 | Walton et al. |
| 6,771,599 | B1 | 8/2004 | Aoyama et al. |
| 6,832,080 | B1 | 12/2004 | Arslan et al. |
| 6,870,808 | B1 | 3/2005 | Liu et al. |
| 6,917,580 | B2 | 7/2005 | Wang et al. |
| 6,934,340 | B1 | 8/2005 | Dollard |
| 6,947,748 | B2 | 9/2005 | Li |
| 6,996,056 | B2 | 2/2006 | Chheda et al. |
| 7,006,466 | B2 | 2/2006 | Borst et al. |
| 7,042,856 | B2 | 5/2006 | Walton et al. |
| 7,054,308 | B1 | 5/2006 | Conway |
| 7,076,637 | B2 | 7/2006 | Kelley |
| 7,197,316 | B2 | 3/2007 | Karger |
| 7,221,653 | B2 | 5/2007 | Vanghi |
| 7,230,942 | B2 | 6/2007 | Laroia et al. |
| 7,242,958 | B2 | 7/2007 | Chung et al. |
| 7,260,077 | B2 | 8/2007 | Wu et al. |
| 9,257,410 | | 8/2007 | Chun et al. |
| 7,272,110 | B2 | 9/2007 | Lee et al. |
| 7,366,202 | B2 | 4/2008 | Scherzer et al. |
| 7,392,054 | B2 | 6/2008 | Cho |
| 2002/0147017 | A1 | 10/2002 | Li et al. .................. 455/447 |
| 2003/0125040 | A1 | 7/2003 | Walton et al. |
| 2003/0227889 | A1 | 12/2003 | Wu et al. .................. 370/335 |
| 2004/0209579 | A1 * | 10/2004 | Vaidyanathan ............ 455/101 |
| 2004/0209619 | A1 * | 10/2004 | Crisan .................. 455/450 |
| 2005/0096061 | A1 | 5/2005 | Ji et al. |
| 2005/0096062 | A1 * | 5/2005 | Ji et al. .................. 455/450 |
| 2005/0141624 | A1 * | 6/2005 | Lakshmipathi et al. ...... 375/260 |
| 2005/0237971 | A1 * | 10/2005 | Skraparlis .................. 370/329 |
| 2006/0023745 | A1 * | 2/2006 | Koo et al. .................. 370/468 |
| 2006/0120478 | A1 * | 6/2006 | Kim et al. .................. 375/267 |
| 2006/0188044 | A1 * | 8/2006 | Wang et al. .................. 375/347 |

FOREIGN PATENT DOCUMENTS

| | | |
|---|---|---|
| EP | 1473886 | 11/2004 |
| GB | 2313742 | 3/1997 |
| WO | 97001256 | 1/1997 |
| WO | 97049258 | 12/1997 |
| WO | 00059251 | 10/2000 |
| WO | 01076098 | 10/2001 |
| WO | WO 2005/043948 A2 | 12/2005 |

OTHER PUBLICATIONS

Zhang et al., "Enhanced feedback method for enhanced fast-feedback channels", IEEE 802.16 Broadband Wireless Access Working Group, (Online) pgs. 1-9 (Nov. 15, 2004).

International Search Report-PCT/US05/046746, International Search Authority-European Patent Office, Apr. 25, 2006.

* cited by examiner

Non-Interference Pattern
User 4 with Reuse Set (1, 2, 3)

Non-Interference Pattern
User 2 with Reuse Set (1, 3)

Non-Interference Pattern
User 1 with Reuse Set (1)

FEEDBACK TO SUPPORT RESTRICTIVE REUSE

REFERENCE TO CO-PENDING APPLICATIONS FOR PATENT

The present Application for Patent is related to the following co-pending U.S. Patent Application: "Restrictive Reuse Set Management" filed Dec. 22, 2004, 11/021,189, assigned to the assignee hereof, and expressly incorporated by reference herein.

The present Application for Patent is related to the following co-pending U.S. Patent Application: "Restrictive Reuse For A Wireless Communication System" filed Jun. 18, 2004, Ser. No.10/871,084, assigned to the assignee hereof, and expressly incorporated by reference herein.

BACKGROUND

I. Field

The present invention relates generally to communications and more specifically to data transmission in a wireless multiple-access communication system.

II. Background

A wireless multiple-access system can concurrently support communication for multiple wireless terminals on the forward and reverse links. The forward link (or downlink) refers to the communication link from base stations to terminals, and the reverse link (or uplink) refers to the communication link from terminals to base stations. Multiple terminals may simultaneously transmit data on the reverse link and/or receive data on the forward link. This may be achieved by multiplexing the data transmissions on each link to be orthogonal to one another in time, frequency, and/or code domain. The orthogonality ensures that the data transmission for each terminal does not interfere with the data transmissions for other terminals.

A multiple-access system typically has many cells, where the term "cell" can refer to a base station and/or its coverage area depending on the context in which the term is used. Data transmissions for terminals in the same cell may be sent using orthogonal multiplexing to avoid "intra-cell" interference. However, data transmissions for terminals in different cells may not be orthogonalized, in which case each terminal would observe "inter-cell" interference from other cells. The inter-cell interference may significantly degrade performance for certain disadvantaged terminals observing high levels of interference.

To combat inter-cell interference, a wireless system may employ a frequency reuse scheme whereby not all frequency bands available in the system are used in each cell. For example, a system may employ a 7-cell reuse pattern and a reuse factor of K=7. For this system, the overall system bandwidth W is divided into seven equal frequency bands, and each cell in a 7-cell cluster is assigned one of the seven frequency bands. Each cell uses only one frequency band, and every seventh cell reuses the same frequency band. With this frequency reuse scheme, the same frequency band is only reused in cells that are not adjacent to each other, and the inter-cell interference observed in each cell is reduced relative to the case in which all cells use the same frequency band. However, a large reuse factor represents inefficient use of the available system resources since each cell is able to use only a fraction of the overall system bandwidth. More precisely, each cell is able to use only a reciprocal of the reuse factor, i.e., 1/K.

Active set based restricted frequency hopping (ASBR) reduces inter-cell interference in an OFDMA based system. ASBR is a global frequency planning scheme that takes into account the channel and interference measured by users. The key idea behind ASBR is to intelligently deploy frequency reuse for selected users based on their channel qualities. In CDMA systems, active set has been defined for each user for handoff purposes. Sectors in the active set of a user usually contribute most interference to this user's reception on FL and being interfered most severely by this user's transmission on RL. Avoiding interference from sectors in a user's active set is expected to reduce the interference on both FL and RL. Simulations and analysis have shown that the frequency reuse assignment algorithm based on a user's active set yields a 3.5 dB signal-to-interference and noise ratio (SINR) improvement with 25% bandwidth partial loading.

There is therefore a need in the art for techniques to provide feedback to a base station from a terminal to reduce inter-cell interference in a more efficient manner.

SUMMARY

In an aspect, a method of providing feedback to support restrictive reuse in a single-input single-output (SISO) system comprises sending a quality indicator for a non-restrictive reuse set and sending a vectored quality indicator for reuse sets other than the non-restrictive reuse set.

In another aspect, a method of providing feedback to support restrictive reuse in a multiple code word (MCW) multiple-input multiple-output (MIMO) system comprises sending a quality indicator for a non-restrictive reuse set, and sending a vectored quality indicator for at least two reuse sets other than the non-restrictive reuse set for all layers.

In another aspect, a method of providing feedback to support restrictive reuse in a single code word (SCW) multiple-input multiple-output (MIMO) system comprises sending a quality indicator for a non-restrictive reuse set, and sending a vectored quality indicator for all reuse sets other than the non-restrictive reuse set for all layers.

In yet another aspect, a method of providing feedback to support restrictive reuse in a single code word (SCW) multiple-input multiple-output (MIMO) system comprises sending a quality indicator for a reuse set with an optimum quality indicator for each layer, and sending a vectored quality indicator for all reuse sets for all layers.

In an aspect, an apparatus for wireless communications comprises means for sending a quality indicator for a non-restrictive reuse set, and means for sending a vectored quality indicator for reuse sets other than the non-restrictive reuse set.

In another aspect, an apparatus for wireless communications comprises a controller operative to sending a quality indicator for a non-restrictive reuse set, and sending a vectored quality indicator for reuse sets other than the non-restrictive reuse set.

In another aspect, a controller in a wireless device operative to sending a quality indicator for a non-restrictive reuse set, and sending a vectored quality indicator for reuse sets other than the non-restrictive reuse set.

In yet another aspect, a readable media embodying a method for wireless communications comprises sending a quality indicator for a non-restrictive reuse set, and sending a vectored quality indicator for reuse sets other than the non-restrictive reuse set.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Techniques to efficiently avoid or reduce interference from strong interferers in a wireless communication system are described herein. A strong interferer to a given user u may be a base station (on the forward link) or another user (on the reverse link). User u may also be a strong interferer to other users. A strong interference entity for user u may be a strong interferer causing high interference to user u and/or a strong interference observing high interference from or due to user u. Strong interference entities (or interferers/interferees, or simply, interferers/ees) for each user may be identified as described below. Users are allocated system resources (e.g., frequency subbands) that are orthogonal to those used by their strong interferers/ees and thus avoid interfering with one another. These techniques are called "restrictive reuse" techniques and may be used for various wireless systems and for both the forward and reverse links.

In an embodiment of restrictive reuse, each cell/sector is assigned (1) a set of usable subbands that may be allocated to users in the cell/sector and (2) a set of forbidden subbands that are not allocated to the users in the cell/sector. The usable set and the forbidden set for each cell/sector are orthogonal to one other. The usable set for each cell/sector also overlaps the forbidden set for each neighboring cell/sector. A given user u in a cell/sector x may be allocated subbands in the usable set for that cell/sector. If user u observes (or causes) high level of interference from (to) a neighboring cellsector y, then user u may be allocated subbands from a "restricted" set that contains subbands included in both the usable set for cell/sector x and the forbidden set for cell/sector y. User u would then observe (cause) no interference from (to) cell/sector y since the subbands allocated to user u are members of the forbidden set not used by cell/sector y. The subband restriction may be extended to avoid interference from multiple neighboring cells/sectors.

Figure 1:
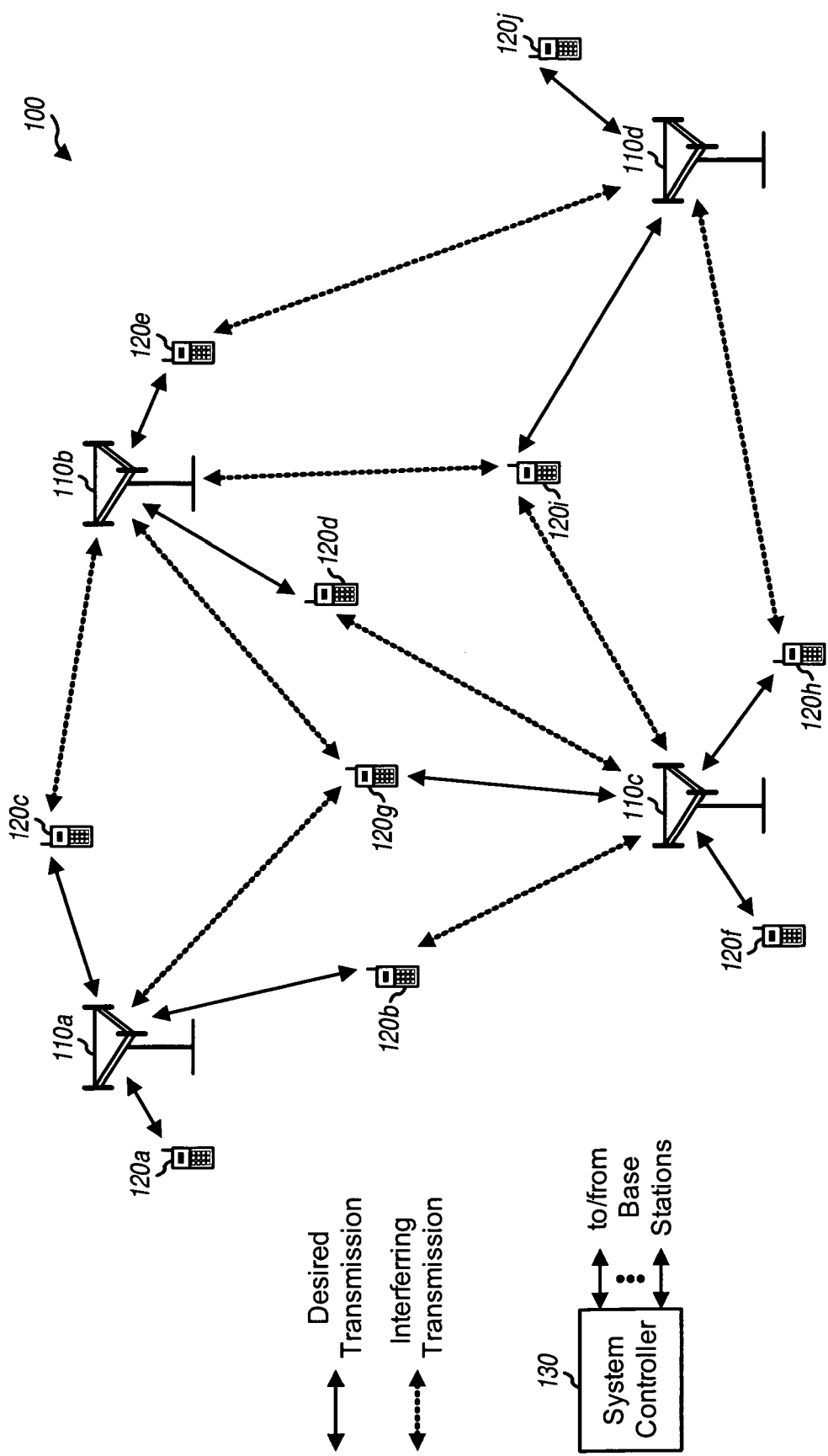
FIG. 1 shows a wireless multiple-access communication system.

FIG. 1 shows a wireless multiple-access communication system 100. System 100 includes a number of base stations 110 that support communication for a number of wireless terminals 120. A base station is a station used for communicating with the terminals and may also be referred to as an access point (AP), a Node B, or some other terminology. Terminals 120 are typically dispersed throughout the system, and each terminal may be fixed or mobile. A terminal may also be referred to as an access terminal (AT), mobile station, a user equipment (UE), a wireless communication device, or some other terminology. Each terminal may communicate with one or possibly multiple base stations on the forward and reverse links at any given moment.

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

For a centralized architecture, a system controller 130 couples to the base stations and provides coordination and control for these base stations. For a distributed architecture, the base stations may communicate with one another as needed, e.g., to serve a terminal, coordinate usage of system resources, and so on.

Figure 2A:
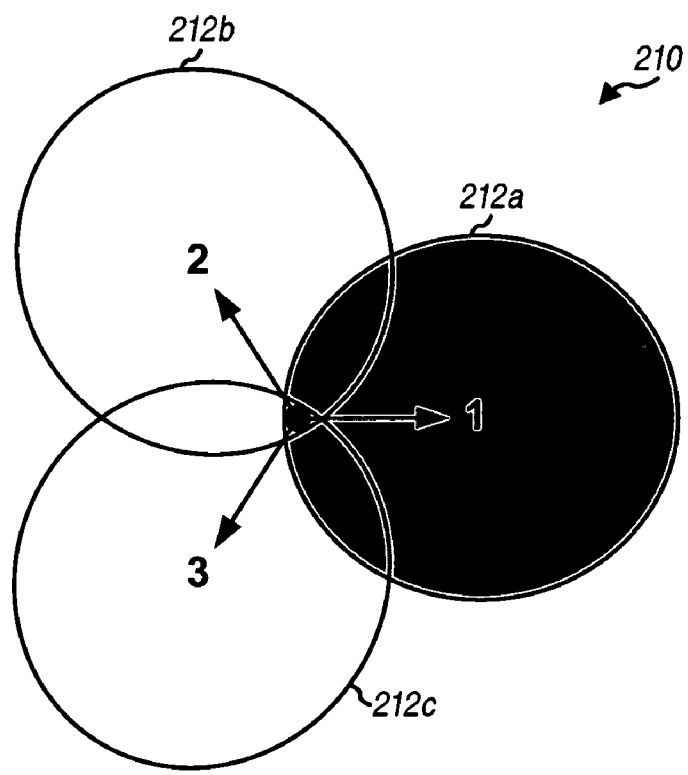
FIGS. 2A and 2B show a sectorized cell and its model, respectively.

FIG. 2A shows a cell 210 with three sectors. Each base station provides communication coverage for a respective geographic area. The coverage area of each base station may be of any size and shape and is typically dependent on various factors such as terrain, obstructions, and so on. To increase capacity, the base station coverage area may be partitioned into three sectors 212a, 212b, and 212c, which are labeled as sectors 1, 2, and 3, respectively. Each sector may be defined by a respective antenna beam pattern, and the three beam patterns for the three sectors may point 120° from each other. The size and shape of each sector are generally dependent on the antenna beam pattern for that sector, and the sectors of the cell typically overlap at the edges. A cell/sector may not be a contiguous region, and the cell/sector edge may be quite complex.

Figure 2B:
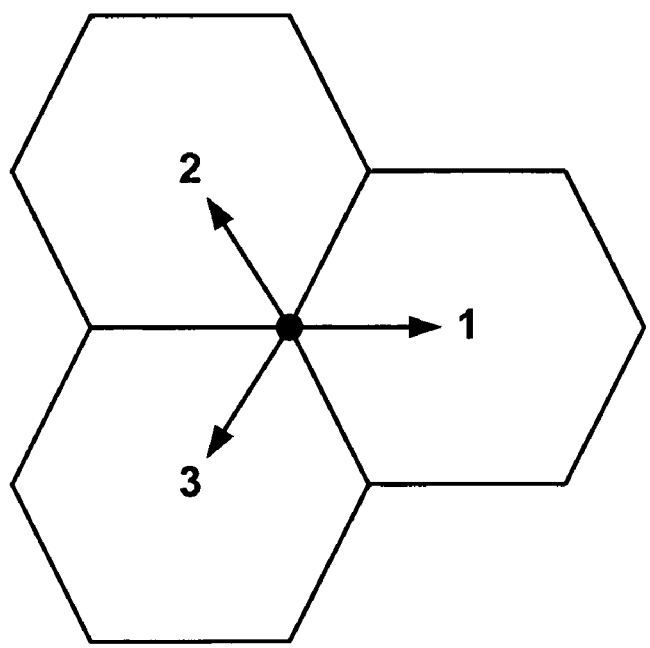

FIG. 2B shows a simple model for sectorized cell 210. Each of the three sectors in cell 210 is modeled by an ideal hexagon that approximates the boundary of the sector. The coverage area of each base station may be represented by a clover of three ideal hexagons centered at the base station.

Each sector is typically served by a base transceiver subsystem (BTS). In general, the term "sector" can refer to a BTS and/or its coverage area, depending on the context in which the term is used. For a sectorized cell, the base station for that cell typically includes the BTSs for all sectors of that cell. For simplicity, in the following description, the term "base station" is used generically for both a fixed station that serves a cell and a fixed station that serves a sector. A "serving" base station or "serving" sector is one with which a terminal communicates. The terms "terminal" and "user" are also used interchangeably herein.

The restrictive reuse techniques may be used for various communication systems. For clarity, these techniques are described for an Orthogonal Frequency Division Multiple Access (OFDMA) system that utilizes orthogonal frequency division multiplexing (OFDM). OFDM effectively partitions the overall system bandwidth into a number of (N) orthogonal frequency subbands, which are also referred to as tones, sub-carriers, bins, frequency channels, and so on. Each subband is associated with a respective sub-carrier that may be modulated with data.

In the OFDMA system, multiple orthogonal "traffic" channels may be defined whereby (1) each subband is used for only one traffic channel in any given time interval and (2) each traffic channel may be assigned zero, one, or multiple subbands in each time interval. A traffic channel may be viewed as a convenient way of expressing an assignment of subbands for different time intervals. Each terminal may be assigned a different traffic channel. For each sector, multiple data transmissions may be sent simultaneously on multiple traffic channels without interfering with one another.

The OFDMA system may or may not use frequency hopping (FH). With frequency hopping, a data transmission hops from subband to subband in a pseudo-random manner, which can provide frequency diversity and other benefits. For a frequency hopping OFDMA (FH-OFDMA) system, each traffic channel may be associated with a specific FH sequence that indicates the particular subband(s) to use for that traffic channel in each time interval (or hop period). The FH sequences for different traffic channels in each sector are orthogonal to one another so that no two traffic channels use the same subband in any given hop period. The FH sequences for each sector may also be pseudo-random with respect to the FH sequences for neighboring sectors. These properties for the FH sequences minimize intra-sector interference and randomize inter-sector interference.

In the OFDMA system, users with different channel conditions may be distributed throughout the system. These users may have different contribution and tolerance to inter-sector interference. The channel condition for each user may be quantified by a signal quality metric, which may be defined by a signal-to-interference-and-noise ratio (SINR), a channel gain, a received pilot power, and/or some other quantity measured for the user's serving base station, some other measurements, or any combination thereof. A weak user has a relatively poor signal quality metric (e.g., a low SINR) for its serving base station, e.g., due to a low channel gain for its serving base station and/or high inter-sector interference. A weak user may in general be located anywhere within a sector but is typically located far away from the serving base station. In general, a weak user is less tolerant to inter-sector interference, causes more interference to users in other sectors, has poor performance, and may be a bottleneck in a system that imposes a fairness requirement.

Restrictive reuse can avoid or reduce interference observed/caused by weak users. This may be achieved by determining the likely sources of high inter-sector interference (or strong interferers) and/or the likely victims of high inter-sector interference (or strong interferees) for the weak users. The strong interferers may be base stations (on the forward link) and/or users (on the reverse link) in neighboring sectors. The strong interferees may be users in neighboring sectors. In any case, the weak users are allocated subbands that are orthogonal to those used by the strong interferers/ees.

In an embodiment of restrictive reuse, each sector x is assigned a usable subband set (denoted as Ux) and a forbidden or unused subband set (denoted as Fx). The usable set contains subbands that may be allocated to the users in the sector. The forbidden set contains subbands that are not allocated to users in the sector. The usable set and the forbidden set for each sector are orthogonal or disjoint in that no subband is included in both sets. The usable set for each sector also overlaps the forbidden set for each neighboring sector. The forbidden sets for multiple neighboring sectors may also overlap. The users in each sector may be allocated subbands from the usable set as described below.

Restrictive reuse may be used for systems composed of unsectorized cells as well as systems composed of sectorized cells. For clarity, restrictive reuse is described below for an exemplary system composed of 3-sector cells.

Figure 3:
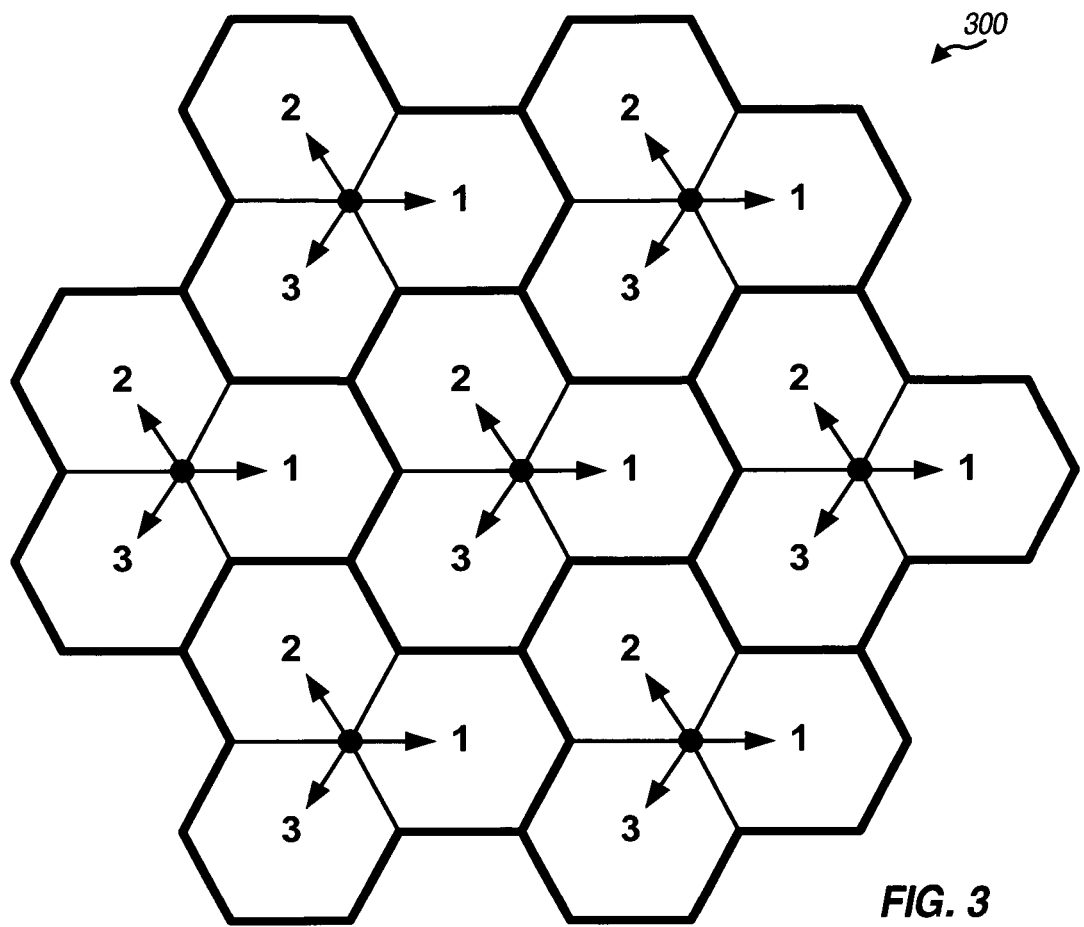
FIG. 3 shows an exemplary multi-cell layout with 3-sector cells.

FIG. 3 shows an exemplary multi-cell layout 300 with each 3-sector cell being modeled by a clover of three hexagons. For this cell layout, each sector is surrounded in the first tier (or the first ring) by sectors that are labeled differently from that sector. Thus, each sector 1 is surrounded by six sectors 2 and 3 in the first tier, each sector 2 is surrounded by six sectors 1 and 3, and each sector 3 is surrounded by six sectors 1 and 2.

Figure 4:
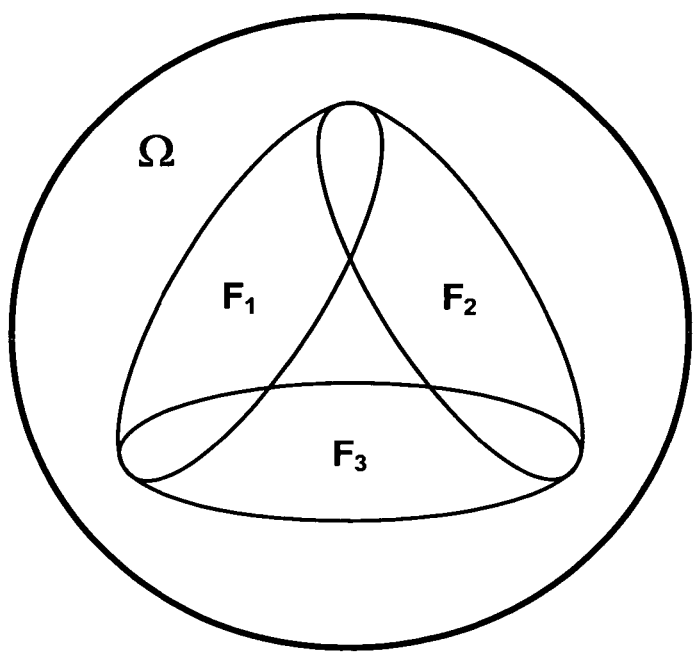
FIG. 4 shows three overlapping forbidden sets for three sectors.

FIG. 4 shows a Venn diagram illustrating a formation of three overlapping sets of subbands, labeled as F1, F2 and F3, which may be used as three forbidden subband sets. In this example, each forbidden set overlaps with each of the other two forbidden sets (e.g., forbidden set F1 overlaps with each of forbidden sets F2 and F3). Because of the overlapping, an intersection set operation on any two forbidden sets yields a non-empty set. This property may be expressed as follows:

$$F_{12}=F_1 \cap F_2 \neq \Theta, F_{13}=F_1 \cap F_3 \neq \Theta, \text{ and } F_{23}=F_2 \cap F_3 \neq \Theta, \quad \text{Eq(1)}$$

where "$\cap$" denotes an intersection set operation;

$F_{xy}$ is a set containing subbands that are members of both sets $F_x$ and $F_y$; and $\Theta$ denotes a null/empty set.

Each of the three forbidden sets F1, F2 and F3 is a subset of a full set $\Omega$ that contains all N total subbands, or $F_1 \subset \Omega$, $F_2 \subset \Omega$, and $F_3 \subset \Omega$. For efficient utilization of the available subbands, the three forbidden sets may also be defined such that there is no overlap over all three sets, which may be expressed as:

$$F_{123}=F_1 \cap F_2 \cap F_3 = \Theta. \quad \text{Eq (2)}$$

The condition in equation (2) ensures that each subband is used by at least one sector.

Three usable subband sets U1, U2 and U3 may be formed based on the three forbidden subband sets F1, F2 and F3, respectively. Each usable set Ux may be formed by a difference set operation between the full set $\Omega$ and forbidden set Fx, as follows:

$$U_1 = \Omega \backslash F_1, U_2 = \Omega \backslash F_2, \text{ and } U_3 = \Omega \backslash F_3, \quad \text{Eq(3)}$$

where "\" denotes a difference set operation; and $U_x$ is a set containing subbands in the full set $\Omega$ that are not in set $F_x$.

The three sectors in each 3-sector cell may be assigned a different pair of usable set and forbidden set. For example, sector 1 may be assigned usable set U1 and forbidden set F1, sector 2 may be assigned usable set U2 and forbidden set F2, and sector 3 may be assigned usable set U3 and forbidden set F3. Each sector is also aware of the forbidden sets assigned to neighboring sectors. Thus, sector 1 is aware of forbidden sets F2 and F3 assigned to neighboring sectors 2 and 3, sector 2 is aware of forbidden sets F1 and F3 assigned to neighboring sectors 1 and 3, and sector 3 is aware of forbidden sets F1 and F2 assigned to neighboring sectors 1 and 2.

Figure 5A:
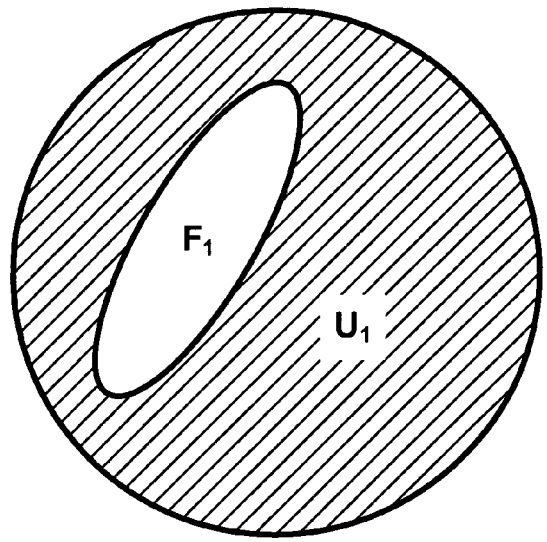
FIGS. 5A through 5D show four unrestricted and restricted sets for a sector.

FIG. 5A shows a Venn diagram for the usable set U1 assigned to sector 1. Usable set U1 (shown by diagonal hashing) includes all of the N total subbands except for those in the forbidden set F1.

Figure 5B:
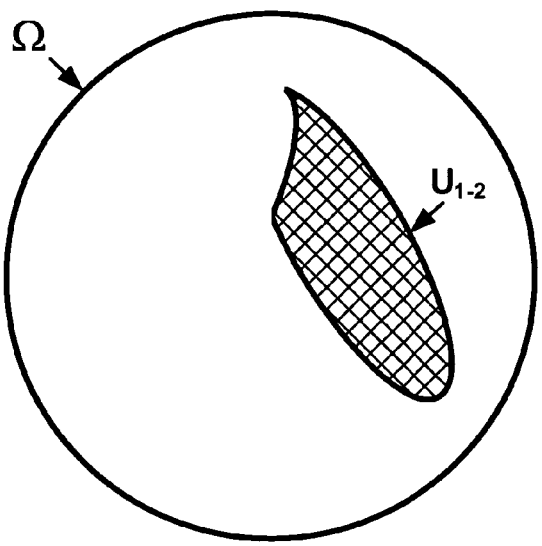

FIG. 5B shows a Venn diagram for a restricted usable set U1-2 (shown by cross-hashing) for sector 1. Restricted set U1-2 contains subbands included in both the usable set U1 for sector 1 and the forbidden set F2 for sector 2. Since the subbands in forbidden set F2 are not used by sector 2, the subbands in restricted set U1-2 are free of interference from sector 2.

Figure 5C:
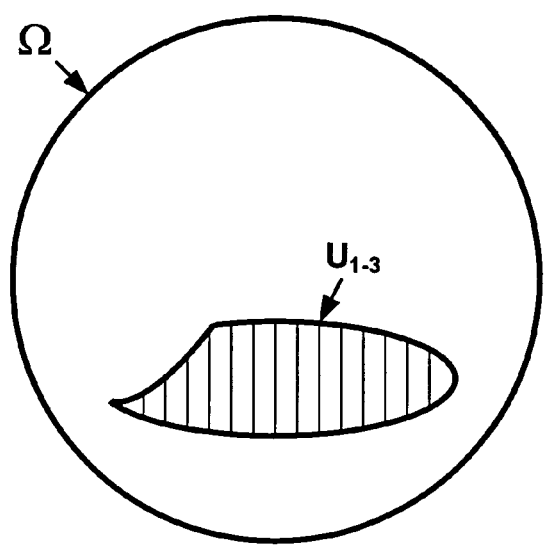

FIG. 5C shows a Venn diagram for a restricted usable set U1-3 (shown by vertical hashing) for sector 1. Restricted set U1-3 contains subbands included in both the usable set U1 for sector 1 and the forbidden set F3 for sector 3. Since the subbands in forbidden set F3 are not used by sector 3, the subbands in restricted set U1-3 are free of interference from sector 3.

Figure 5D:
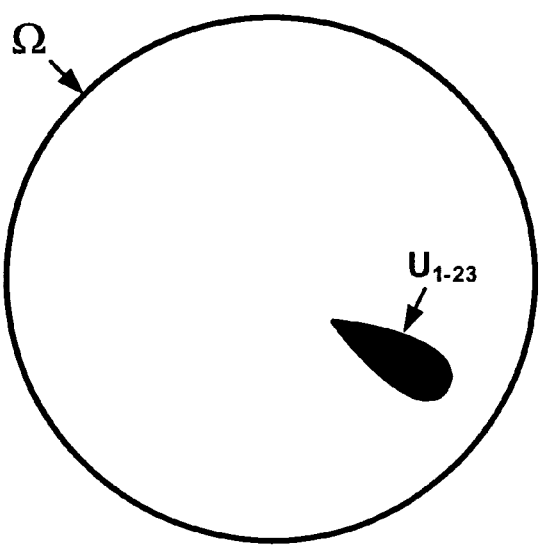

FIG. 5D shows a Venn diagram for a more restricted usable set U1-23 (shown by solid fill) for sector 1. Restricted set U1-23 contains subbands included in all three of the usable set U1 for sector 1, the forbidden set F2 for sector 2, and the forbidden set F3 for sector 3. Since the subbands in forbidden sets F2 and F3 are not used by sectors 2 and 3, respectively, the subbands in restricted set U1-23 are free of interference from both sectors 2 and 3.

As shown in FIGS. 5A through 5D, the restricted usable sets U1-2, U1-3 and U1-23 are different subsets of the unrestricted usable set U1 assigned to sector 1. Restricted usable sets U2-1, U2-3 and U2-13 may be formed for sector 2, and restricted usable sets U3-1, U3-2 and U3-12 may be formed for sector 3 in similar manner.

Table 1 lists the various usable subband sets for the three sectors and the manner in which these sets may be formed. The "reuse" sets in Table 1 are described below. Table 1 is for illustrative purposes only. It would be apparent to those skilled in the art that the reuse sets are not limited to those shown in Table 1. The reuse sets would be different from that shown in Table 1 if there were, for example, more than three sectors per cell.

TABLE 1

| Reuse Set | Usable Subband Sets | Description |
| --- | --- | --- |
| (1) | $U_1 = \Omega \backslash F_1$ | Main/unrestricted usable set for sector 1 |
| (1, 2) | $U_{1-2} = U_1 \cap F_2 = F_2 \backslash (F_1 \cap F_2)$ | Restricted usable set with no interference from sector 2 |
| (1, 3) | $U_{1-3} = U_1 \cap F_3 = F_3 \backslash (F_1 \cap F_3)$ | Restricted usable set with no interference from sector 3 |
| (1, 2, 3) | $U_{1-23} = U_1 \cap F_2 \cap F_3 = F_2 \cap F_3$ | More restricted usable set with no interference from sectors 2 & 3 |
| (2) | $U_2 = \Omega \backslash F_2$ | Main/unrestricted usable set for sector 2 |
| (2, 1) | $U_{2-1} = U_2 \cap F_1 = F_1 \backslash (F_1 \cap F_2)$ | Restricted usable set with no interference from sector 1 |

TABLE 1-continued

| Reuse Set | Usable Subband Sets | Description |
| --- | --- | --- |
| (2, 3) | $U_{2-3} = U_2 \cap F_3 = F_3 \backslash (F_2 \cap F_3)$ | Restricted usable set with no interference from sector 3 |
| (2, 1, 3) | $U_{2-13} = U_2 \cap F_1 \cap F_3 = F_1 \cap F_3$ | More restricted usable set with no interference from sectors 1 & 3 |
| (3) | $U_3 = \Omega \backslash F_3$ | Main/unrestricted usable set for sector 3 |
| (3, 1) | $U_{3-1} = U_3 \cap F_1 = F_1 \backslash (F_1 \cap F_3)$ | Restricted usable set with no interference from sector 1 |
| (3, 2) | $U_{3-2} = U_3 \cap F_2 = F_2 \backslash (F_2 \cap F_3)$ | Restricted usable set with no interference from sector 2 |
| (3, 1, 2) | $U_{3-12} = U_3 \cap F_1 \cap F_2 = F_1 \cap F_2$ | More restricted usable set with no interference from sectors 1 & 2 |

Each sector x (where x=1, 2, or 3) may allocate subbands in its usable set $U_x$ to users in the sector by taking into account the users' channel conditions so that reasonably good performance may be achieved for all users. Sector x may have weak users as well as strong users. A strong user has a relatively good signal quality metric for its serving base station and is typically more tolerant to higher level of inter-sector interference. A weak user is less tolerant to inter-sector interference. Sector x may allocate any of the subbands in its usable set $U_x$ to the strong users in the sector. Sector x may allocate subbands in the restricted sets to the weak users in the sector. The weak users are, in effect, restricted to certain subbands known to be free of interference from strong interfering sectors.

For example, a given user u in sector x may be allocated subbands from usable set $U_x$ for sector x. If user u is deemed to be observing/causing high inter-sector interference from/to sector y, where y≠x, then user u may be allocated subbands from the restricted set $U_{x-y} = U_x \cap F_y$. If user u is further deemed to be observing/causing high inter-sector interference from/to sector z, where z≠x and z≠y, then user u may be allocated subbands from the more restricted set $U_{x-yz} = U_x \cap F_y \cap F_z$.

Figure 6:
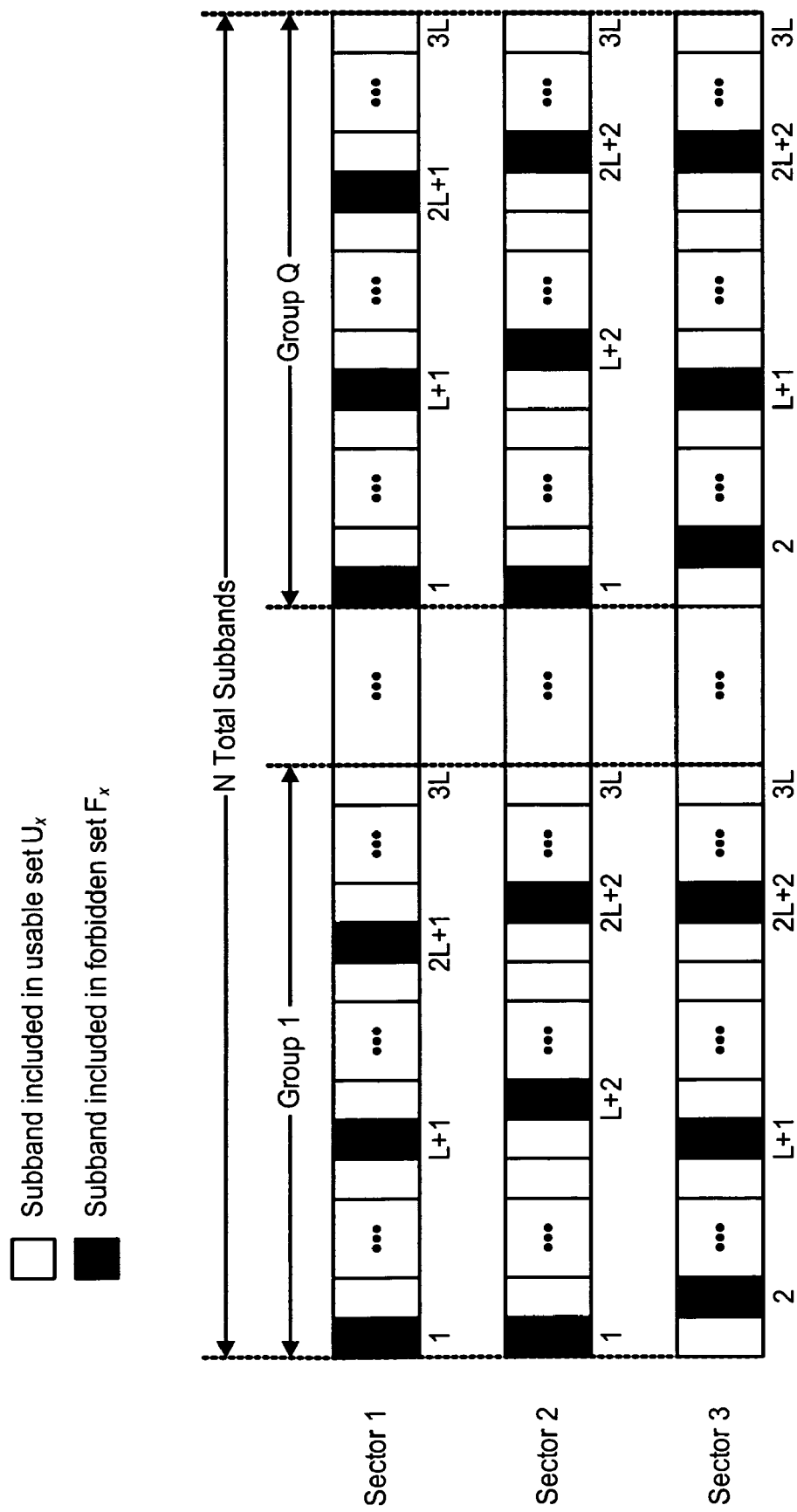
FIG. 6 shows an example for forming three forbidden subband sets.

FIG. 6 shows an example for forming the three forbidden subband sets F1, F2 and F3. In this example, the N total subbands are partitioned into Q groups, with each group containing 3·L subbands that are given indices of 1 through 3L, where Q≧1 and L>1. Forbidden set F1 contains subbands 1, L+1, and 2L+1 in each group. Forbidden set F2 contains subbands 1, L+2, and 2L+2 in each group. Forbidden set F3 contains subbands 2, L+1, and 2L+2 in each group. Set F12 then contains subband 1 in each group, set F13 contains subband L+1 in each group, and set F23 contains subband 2L+2 in each group.

In general, each forbidden set may contain any number of subbands and any one of the N total subbands, subject to the constraints shown in equation (1) and possibly (2). To obtain frequency diversity, each forbidden set may contain subbands taken from across the N total subbands. The subbands in each forbidden set may be distributed across the N total subbands based on a predetermined pattern, as shown in FIG. 6. Alternatively, the subbands in each forbidden set may be pseudo-randomly distributed across the N total subbands. The three forbidden sets F1, F2 and F3 may also be defined with any amount of overlap. The amount of overlap may be dependent on various factors such as, for example, the desired effective reuse factor for each sector (described below), the expected number of weak users in each sector, and so on. The three forbidden sets may overlap each other by the same amount, as shown in FIG. 4, or by different amounts.

Each user may be associated with a "reuse" set that contains the serving sector for the user as well as strong interferers/ees, if any, for the user. The serving sector is denoted by boldfaced and underlined text in the reuse set. The strong interferers/ees are denoted by normal text, after the boldfaced and underlined text for the serving sector, in the reuse set. For example, a reuse set of (2, 1, 3) denotes sector 2 being the serving sector and sectors 1 and 3 being strong interferers/ees.

Strong interferers to a given user u on the forward link are typically fixed and may be specifically identified, e.g., based on pilots transmitted by the sectors. Strong interferers to user u on the reverse link may not be easily identified by forward link measurement performed by user u and may be deduced, e.g., based on reverse link interference measurement by the serving base station of user u. Strong interferees for user u may also be specifically identified or deduced. Strong interferers/ees for each user may be determined in various manners.

In one embodiment, strong interferers/ees for a given user u are determined based on received pilot powers, as measured by user u, for different sectors. Each sector may transmit a pilot on the forward link for various purposes such as signal detection, timing and frequency synchronization, channel estimation, and so on. User u may search for pilots transmitted by the sectors and measure the received power of each detected pilot. User u may then compare the received pilot power for each detected sector against a power threshold and add the sector to its reuse set if the received pilot power for the sector exceeds the power threshold.

In another embodiment, strong interferers/ees for user u are determined based on an "active" set maintained by user u. The active set contains all sectors that are candidates for serving user u. A sector may be added to the active set, e.g., if the received pilot power for the sector, as measured by user u, exceeds an add threshold (which may or may not be equal to the power threshold described above). Each user in the system may be required to (e.g., periodically) update its active set and to report the active set to its serving sector. The active set information may be readily available at the sector and may be used for restrictive reuse.

In yet another embodiment, strong interferers/ees for user u are determined based on received pilot powers, as measured at different sectors, for user u. Each user may also transmit a pilot on the reverse link for various purposes. Each sector may search for pilots transmitted by users in the system and measure the received power of each detected pilot. Each sector may then compare the received pilot power for each detected user against the power threshold and inform the user's serving sector if the received pilot power exceeds the power threshold. The serving sector for each user may then add sectors that have reported high received pilot powers to that user's reuse set.

In yet another embodiment, strong interferers/ees for user u are determined based on a position estimate for user u. The position of user u may be estimated for various reasons (e.g., to provide location service to user u) and using various position determination techniques (e.g., Global Positioning System (GPS), Advanced Forward Link Trilateration (A-FLT), and so on, which are known in the art). The strong interferers/ees for user u may then be determined based on the position estimate for user u and sector/cell layout information.

Several embodiments for determining strong interferers/ees for each user have been described above. Strong interferers/ees may also be determined in other manners and/or based on other quantities besides received pilot power. A good signal quality metric for determining strong interferers on the forward link is an average SINR measured at a user for a base station, which is also called "geometry". A good signal quality metric for determining strong interferees on the reverse link is a channel gain measured at a user for a base station, since SINR measurement is not available at the user for the base station. A single reuse set may be maintained for both the forward and reverse links, or separate sets may be used for the two links. The same or different signal quality metrics may be used to update the sectors in the reuse set for the forward and reverse links.

In general, strong interferers/ees may be specifically identified based on direct measurements (e.g., for the forward link) or deduced based on related measurements, sector/cell layout, and/or other information (e.g., for the reverse link). For simplicity, the following description assumes that each user is associated with a single reuse set that contains the serving sector and other sectors (if any) deemed to be strong interferers/ees for the user.

In a well-designed system, a weak user should have a relatively fair signal quality metric for at least one neighboring sector. This allows the weak user to be handed off from a current serving sector to a neighboring sector if necessary. Each such neighboring sector may be deemed as a strong interferer/ee to the weak user and may be included in the user's reuse set.

Figure 7A:
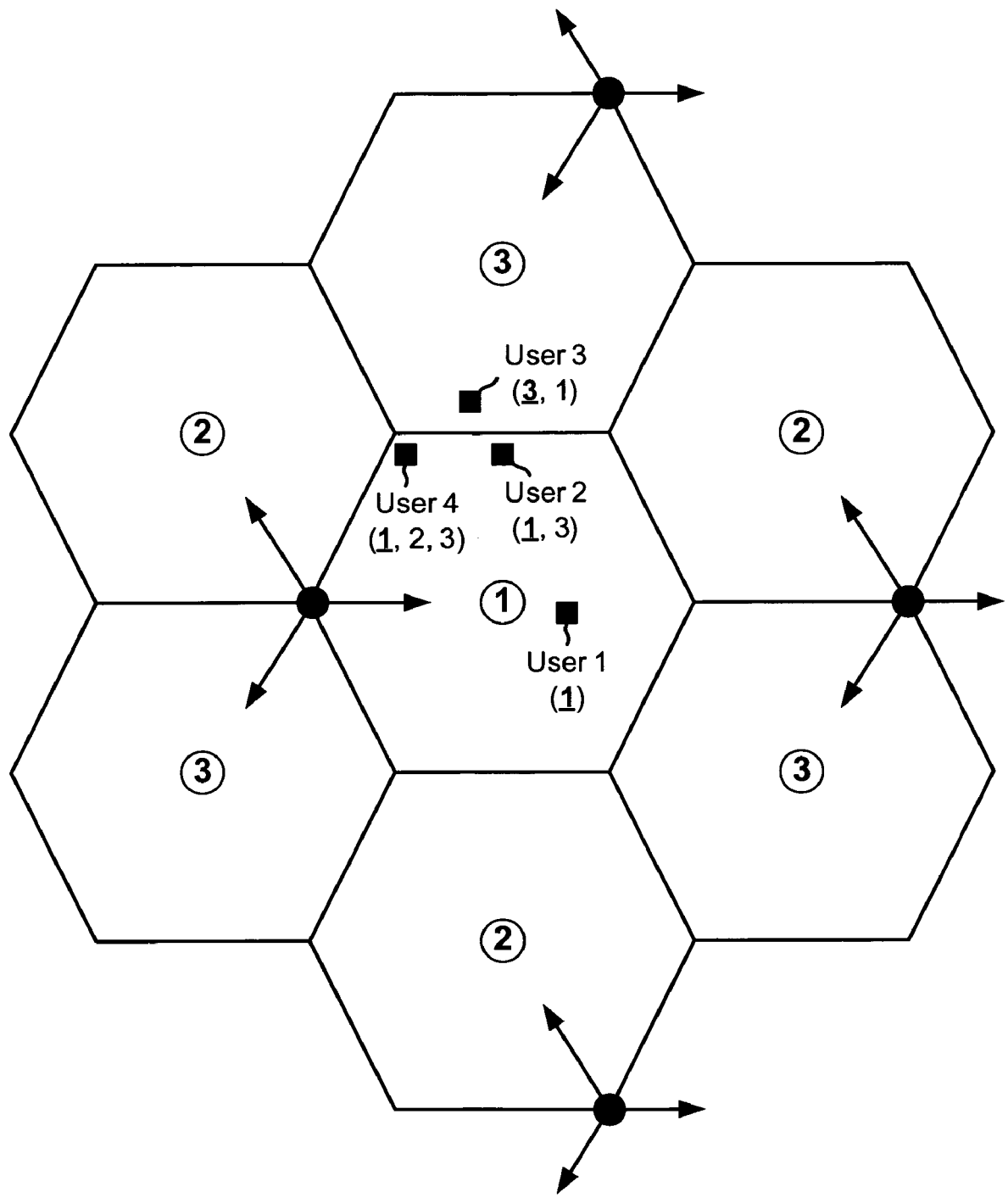
FIGS. 7A through 7D show a distribution of four users in a cluster of seven sectors and non-interference patterns for three of the users.

FIG. 7A shows an example distribution of four users in a cluster of seven sectors. In this example, user 1 is located near the middle of sector 1 and has a reuse set of (1). User 2 is located near the boundary between sectors 1 and 3 and has a reuse set of (1, 3). User 3 is also located near the boundary between sectors 1 and 3 but has a reuse set of (3, 1). User 4 is located near the boundary of sectors 1, 2 and 3 and has a reuse set of (1, 2, 3).

Figure 7D:
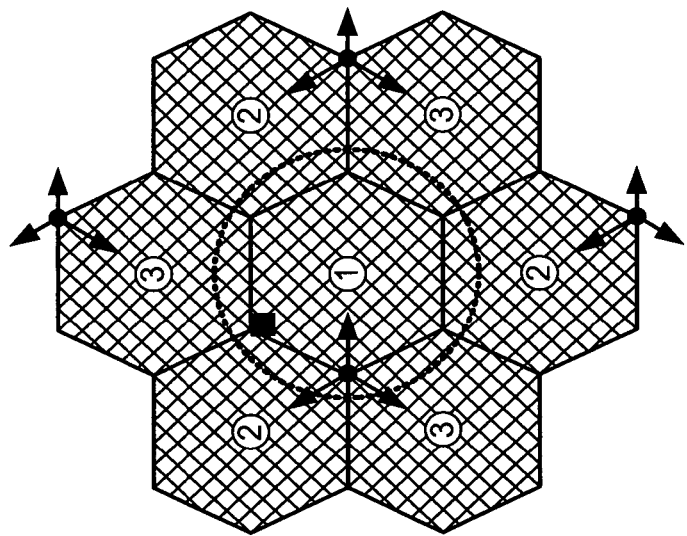
Figure 7C:
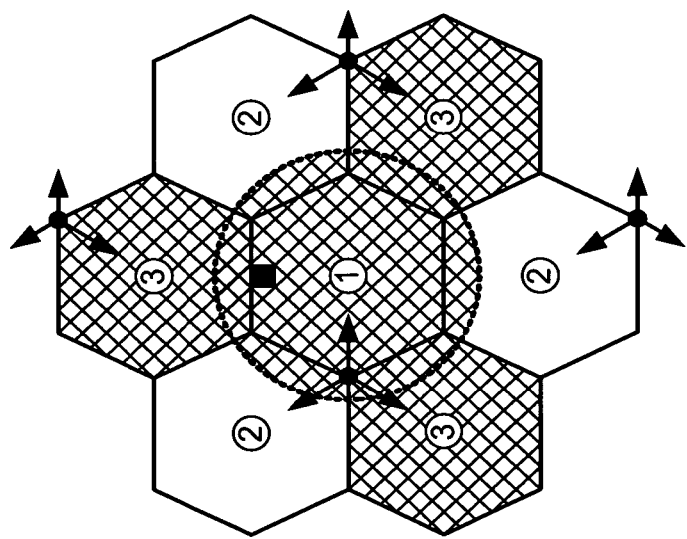
Figure 7B:
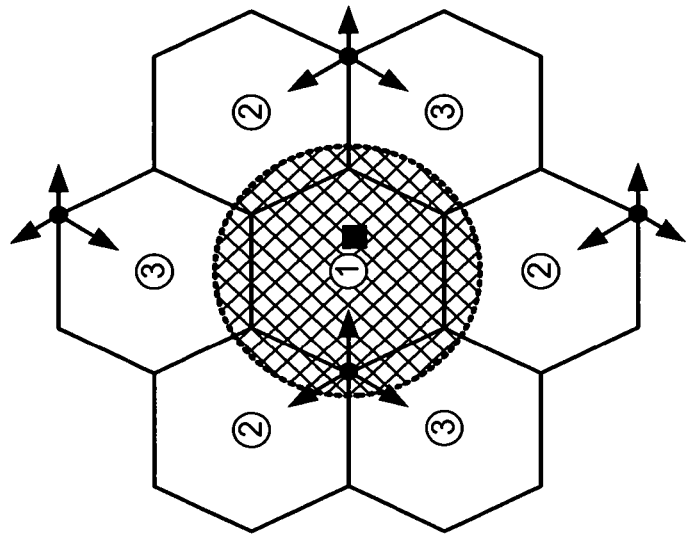

FIG. 7B shows a non-interference pattern for user 1 in FIG. 7A. User 1 is allocated subbands in usable set U1 since its reuse set is (1). Because users in sector 1 are allocated orthogonal subbands, user 1 does not interfere with other users in sector 1. However, usable set U1 is not orthogonal to usable sets U2 and U3 for sectors 2 and 3, respectively. Thus, user 1 observes interference from the six neighboring sectors 2 and 3 in the first tier around sector 1. User 1 typically observes interference from distant or weak interferers in these six neighboring sectors because strong interferers (to sector 1/user 1) in these neighboring sectors are allocated subbands (e.g., in restricted sets U2-1 and U3-1) that are orthogonal to those in usable set U1. The area where other users do not interfere with user 1 is shown by cross-hashing and covers sector 1 and the edges of other sectors that neighbor sector 1 (since the users in these neighboring sectors 2 and 3 may be assigned subbands that are not used by sector 1).

FIG. 7C shows a non-interference pattern for user 2 in FIG. 7A. User 2 is allocated subbands in restricted set $U_{1\text{-}3}=U_1 \cap F_3$ since its reuse set is (1, 3). Because sector 3 does not use the subbands in its forbidden set F3, the subbands allocated to user 2 are orthogonal to the subbands used by sector 3. Thus, user 2 does not observe any interference from other users in sector 1 as well as users in sector 3. User 2 observes interference from distant interferers in the three first-tier neighboring sectors 2. The area where other users do not interfere with user 2 covers sectors 1 and 3 and the edges of sectors 2 that neighbor sector 1 (for the reason noted above for FIG. 7B).

FIG. 7D shows a non-interference pattern for user 4 in FIG. 7A. User 4 is allocated subbands in restricted set $U_{1-23} = U_1 \cap F_2 \cap F_3$ since its reuse set is (1, 2, 3). Because sectors 2 and 3 do not use the subbands in their forbidden sets F2 and F3, respectively, the subbands allocated to user 4 are orthogonal to the subbands used by sectors 2 and 3. Thus, user 4 does not observe any interference from other users in sector 1 as well as users in the six first-tier neighboring sectors 2 and 3. The area where other users do not interfere with user 4 covers sectors 1, 2 and 3.

In FIG. 7A, users 2 and 3 are located in close proximity and would have interfered strongly with each other without restrictive reuse. With restrictive reuse, user 2 is allocated subbands in restricted set $U_{1-3} = U_1 \cap F_3$ since its reuse set is (1, 3), and user 3 is allocated subbands in restricted set $U_{3-1} = U_3 \cap F_1$ since its reuse set is (3, 1). Restricted sets U1-3 and U3-1 are mutually orthogonal since each restricted set $U_{x-y}$ contains only subbands that are excluded from the usable set $U_y$ of which the other restricted set $U_{y-x}$ is a subset. Because users 2 and 3 are allocated subbands from orthogonal restricted sets U1-3 and U3-1, respectively, these two users do not interfere with one another.

As shown in FIGS. 7A through 7D, the interference experienced by a user decreases as the size of its reuse set increases. A user with a reuse set size of one (e.g., user 1 in FIG. 7B) is interfered by distant interferers in six first-tier neighboring sectors. A user with a reuse set size of two (e.g., user 2 in FIG. 7C) is interfered by distant interferers in three first-tier neighboring sectors. A user with a reuse set size of three is interfered by interferers in second-tier neighbor sectors. In contrast, without restrictive reuse, all users in the system would be interfered by randomly distributed interferers from all six first-tier neighboring sectors.

Restrictive reuse may be used to mitigate inter-sector interference for weak users on both the forward and reverse links. On the forward link, a weak user u in sector x may observe high inter-sector interference from base stations for neighboring sectors that are in its reuse set. Weak user u may be allocated subbands that are not used by these neighboring sectors and would then observe no interference from the base stations for these sectors. Restrictive reuse may thus directly improve the SINRs of individual weak user u.

On the reverse link, weak user u may observe high inter-sector interference from users in neighboring sectors that are in its reuse set. Weak user u may be allocated subbands that are not used by these neighboring sectors and would then observe no interference from the users in these sectors. Weak user u may also be a strong interferer to the users in the neighboring sectors. Weak user u typically transmits at a high power level in order to improve its received SINR at its serving sector x. The high transmit power causes more interference to all users in the neighboring sectors. By restricting weak user u to subbands not used by the neighboring sectors in the reuse set, weak user u would cause no interference to the users in these sectors.

When restrictive reuse is applied across the system, weak user u may benefit from lower inter-sector interference on the reverse link even if the strong interferers to weak user u cannot be identified. Weak users in neighboring sectors that have sector x in their reuse sets may be strong interferers to weak user u as well as other users in sector x. These strong interferers may be allocated subbands that are not used by sector x and would then cause no interference to the users in sector x. User u may thus observe no inter-sector interference from these strong interferers even though user u is not able to identify them. Restrictive reuse generally improves the SINRs of all weak users.

For both the forward and reverse links, restrictive reuse can avoid or reduce interference observed by weak users from strong interferers and thus improve the SINRs for the weak users. Restrictive reuse may reduce the variation in SINRs among users in the system. As a result, improved communication coverage as well as higher overall system capacity may be achieved for the system.

Figure 8:
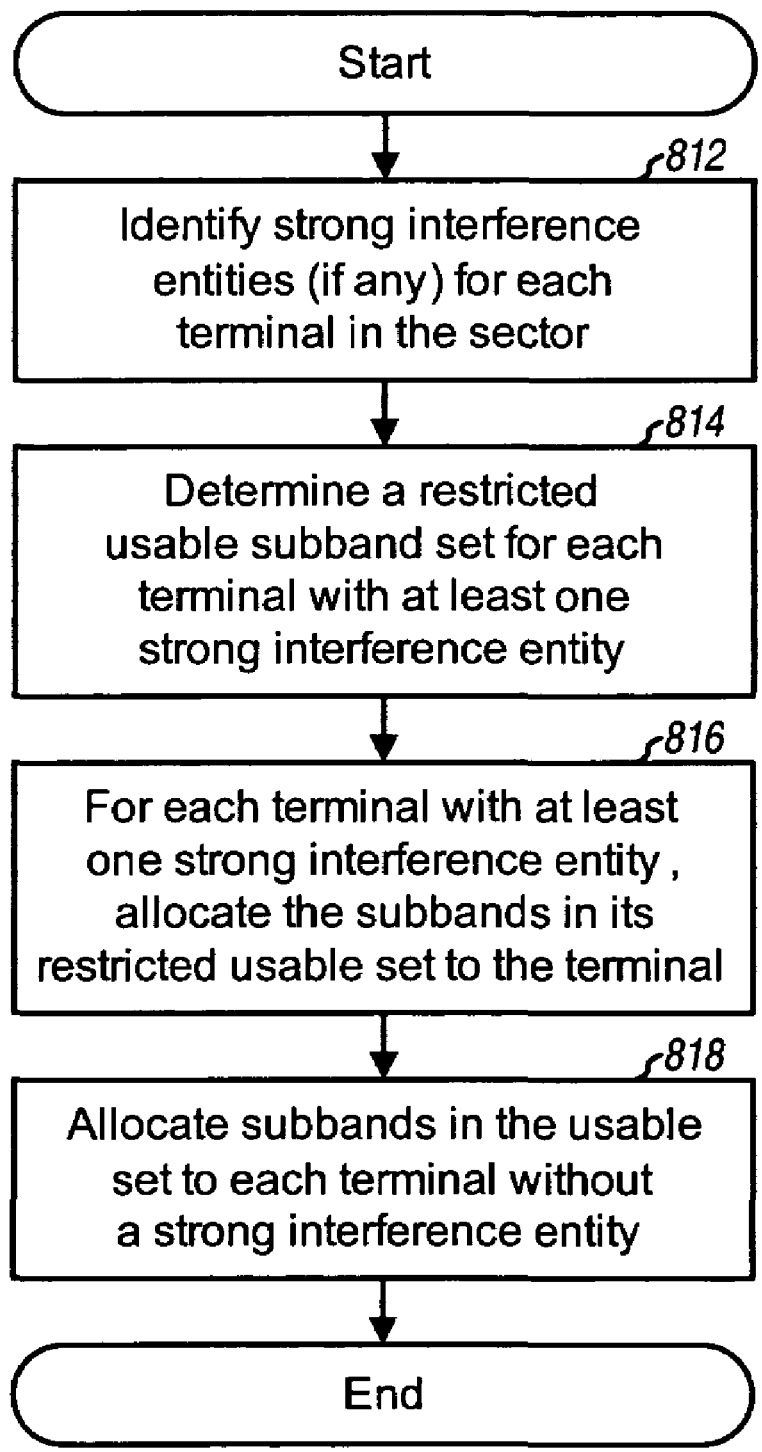
FIG. 8 shows a process for allocating subbands to users with restrictive reuse.

FIG. 8 shows a flow diagram of a process 800 for allocating subbands to users in a sector with restrictive reuse. Process 800 may be performed by/for each sector. Initially, strong "interference entities", if any, for each user in the sector are identified (block 812). A strong interference entity for a given user u may be (1) a strong interferer causing high interference to user u and/or (2) a strong interference observing high interference from or due to user u. A strong interference entity for user u may thus be (1) a base station causing high interference to user u on the forward link, (2) another user causing high interference to user u on the reverse link, (3) a base station observing high interference from user u on the reverse link, (4) another user observing high interference from user u's serving base station on the forward link, or (5) some other entity for which mitigation of interference with user u is sought. The strong interference entities may be identified based on, e.g., received pilot powers measured by the user for different sectors, received pilot powers measured by different sectors for the user, and so on. The strong interference entities for each user may be included in the user's reuse set, as described above. In any case, a restricted usable set is determined for each user with at least one strong interference entity (block 814). The restricted set for each user may be obtained by performing an intersection set operation on the usable set for the user's serving sector with the forbidden set for each strong interference entity, or $U_{x-y\ldots} = U_x \cap F_{y\ldots}$. Each user with at least one strong interference entity is allocated subbands in the restricted set determined for that user (block 816). Each user without a strong interference entity is allocated remaining subbands in the usable set for the sector (block 818). The process then terminates.

Process 800 shows allocation of subbands to weak users with at least one strong interference entity first, then allocation of remaining subbands to strong users. In general, the weak and strong users may be allocated subbands in any order. For example, users may be allocated subbands based on their priority, which may be determined from various factors such as the SINRs achieved by the users, the data rates supported by the users, the payload size, the type of data to be sent, the amount of delay already experienced by the users, outage probability, the maximum available transmit power, the type of data services being offered, and so on. These various factors may be given appropriate weights and used to prioritize the users. The users may then be allocated subbands based on their priority.

Process 800 may be performed by each sector in each scheduling interval, which may be a predetermined time interval. Each sector may send signaling (e.g., to all users or to only users allocated different subbands) to indicate the subbands allocated to each user. Process 800 may also be performed (1) whenever there is a change in users in the sector (e.g., if a new user is added or a current user is removed), (2) whenever the channel conditions for the users change (e.g., whenever the reuse set for a user changes), or (3) at any time and/or due to any triggering criterion. At any given moment, all of the subbands may not be available for scheduling, e.g., some subbands may already be in use for retransmissions or some other purposes.

The forbidden sets represent overhead for supporting restrictive reuse. Since the subbands in forbidden set $F_x$ are not used by sector x, the percentage of the total subbands usable by sector x, which is also the effective reuse factor for sector x, may be given as: $|U_x|/|\Omega|=(|\Omega|-|F_x|)/|\Omega|$, where $|U_x|$ denotes the size of set $U_x$. To reduce the amount of overhead for restrictive reuse, the forbidden sets may be defined to be as small as possible. However, the sizes of the restricted sets are dependent on the sizes of the forbidden sets. Thus, the forbidden sets may be defined based on expected requirements for weak users and possibly other factors.

The usable and forbidden sets may be defined in various manners. In one embodiment, the usable and forbidden sets are defined based on global frequency planning for the system and remain static. Each sector is assigned a usable set and a forbidden set, forms its restricted sets as described above, and thereafter uses the usable and restricted sets. This embodiment simplifies implementation for restrictive reuse since each sector can act autonomously, and no signaling between neighboring sectors is required. In a second embodiment, the usable and forbidden sets may be dynamically defined based on sector loading and possibly other factors. For example, the forbidden set for each sector may be dependent on the number of weak users in neighboring sectors, which may change over time. A designated sector or a system entity (e.g., system controller 130) may receive loading information for various sectors, define the usable and forbidden sets, and assign the sets to the sectors. This embodiment may allow for better utilization of system resources based on the distribution of users. In yet another embodiment, the sectors may send inter-sector messages to negotiate the usable and forbidden sets.

Restrictive reuse can support handoff, which refers to the transfer of a user from a current serving base station to another base station that is deemed better. Handoff may be performed as needed to maintain good channel conditions for users on the edge of sector coverage (or "sector-edge" users). Some conventional systems (e.g., a Time Division Multiple Access (TDMA) system) support "hard" handoff whereby a user first breaks away from the current serving base station and then switches to a new serving base station. A Code Division Multiple Access (CDMA) system supports "soft" and "softer" handoffs, which allow a user to simultaneously communicate with multiple cells (for soft handoff) or multiple sectors (for softer handoff). Soft and softer handoffs can provide additional mitigation against fast fading.

Restrictive reuse can reduce interference for sector-edge users, which are good candidates for handoff. Restrictive reuse can also support hard, soft, and softer handoffs. A sector-edge user u in sector x may be allocated subbands in the restricted set $U_{x-y}$, which is free of interference from neighboring sector y. Sector-edge user u may also communicate with sector y via subbands in the restricted set $U_{y-x}$, which is free of interference from sector x. Since the restricted sets $U_{x-y}$ and $U_{y-x}$ are disjoint, user u may simultaneously communicate with both sectors x and y (and with no interference from strong interferers in both sectors) for soft or softer handoff. User u may also perform hard handoff from sector x to sector y. Since restricted sets $U_{x-y}$ and $U_{y-x}$ are absent of strong interferers from sectors y and x, respectively, the received SINR of user u may not change quite as abruptly when user u is handed off from sector x to sector y, which can ensure a smooth handoff.

Power control may or may not be used in combination with restrictive reuse. Power control adjusts the transmit power for a data transmission such that the received SINR for the transmission is maintained at a target SINR, which may in turn be adjusted to achieve a particular level of performance, e.g., 1% packet error rate (PER). Power control may be used to adjust the amount of transmit power used for a given data rate, so that interference is minimized. Power control be used for certain (e.g., fixed rate) transmissions and omitted for other (e.g., variable rate) transmissions. Full transmit power may be used for a variable rate transmission (such as a hybrid automatic retransmission (H-ARQ), which is continual transmission of additional redundancy information for each packet until the packet is decoded correctly) in order to achieve the highest rate possible for a given channel condition.

In the above embodiment for restrictive reuse, each sector is associated with one usable set and one forbidden set. Some other embodiments of restrictive reuse are described below.

In another embodiment of restrictive reuse, each sector x is assigned an unrestricted usable subband set Ux and a "limited use" subband set Lx. The unrestricted usable set contains subbands that may be allocated to any users in the sector. The limited use set contains subbands having certain use restrictions such as, e.g., a lower transmit power limit. Sets Ux and Lx may be formed in the manner described above for sets Ux and Fx, respectively.

Each sector x may allocate the subbands in sets Ux and Lx by taking into account the channel conditions for the users so that good performance may be achieved for all users. The subbands in set Ux may be allocated to any user in sector x. Weak users in sector x may be allocated subbands in (1) a restricted set $U_{x-y}=U_x \cap L_y$, if high interference is observed from neighboring sector y, (2) a restricted set $U_{x-z}=U_x \cap L_z$, if high interference is observed from neighboring sector z, or (3) a restricted set $U_{x-yz}=U_x \cap L_y \cap L_z$, if high interference is observed from neighboring sectors y and z. Strong users in sector x may be allocated subbands in Lx.

A strong user v in sector x has a good signal quality metric for its serving sector x and may be allocated subbands in the limited use set Lx. On the forward link, sector x may transmit at or below the lower power limit for set Lx to strong user v. On the reverse link, strong user v may transmit at or below the lower power limit to serving sector x. Good performance may be achieved for strong user v for both the forward and reverse links, even with the lower transmit power, because of the good signal quality metric achieved by strong user v for sector x.

Strong user v typically has poor signal quality metrics for neighboring sectors. On the forward link, the lower transmit power used by sector x for strong user v causes low (and typically tolerable) levels of interference to users in neighboring sectors. On the reverse link, the lower transmit power used by strong user v plus the lower channel gains for neighboring sectors result in low (and typically tolerable) levels of interference to the users in the neighboring sectors.

In yet another embodiment of restrictive reuse, each reuse set is associated with a sorted list of subband sets that may be used for the reuse set. Due to frequency planning restrictions, the bandwidth of some restricted sets may be quite small, such as restricted set U1-23 which corresponds to reuse set (1,2,3). Suppose user u observes high interference from sectors 2 and 3 and is assigned to reuse set (1,2,3). Although user u will experience higher SINR due to reduced interference, the bandwidth loss resulting from a restriction to a small restricted set U1-23 may be detrimental in terms of the achievable throughput of user u. Hence, for users in reuse set (1,2,3), a sorted list of subband sets with descending preference may be defined, e.g., (U1-23, [U1-2, U1-3], U1), where the subband sets within the square brackets have equal preference. The users in reuse set (1,2,3) may then use larger bandwidth, if necessary, by using additional subband sets in the sorted list associated with reuse set (1,2,3). For users in reuse set (1,2), the sorted list maybe (U1-2, U1, U1-3, U1-23). For users in reuse set (1), the sorted list may be (U1, [U1-2, U1-3], U1-23). The sorted list for each reuse set may be defined to (1) reduce the amount of interference observed by the users in the reuse set and/or (2) reduce the amount of interference caused by the users in the reuse set.

In still yet another embodiment of restrictive reuse, each sector x is assigned multiple (M) usable sets and multiple (e.g. M) forbidden sets. The number of usable sets may or may not be equal to the number of forbidden sets. As an example, multiple (M) pairs of usable and forbidden sets may be formed, with the usable set Ux and the forbidden set Fx in each pair being formed such that each of the N total subbands is included in only set Ux or set Fx, e.g., $\Omega = U_x \cup F_x$, where "$\cup$" denotes a union set operation. However, in general, the M usable sets and M forbidden sets may be formed in various manners.

For example, the M usable sets may be formed such that they are successively smaller subsets of the largest usable set. Each sector may then use the smallest possible usable set based on its loading. This may reduce the total interference to neighboring sectors when the sector is partially loaded. This may also increase the variation in the interference observed by neighboring sectors, which may be exploited to improve overall system performance.

The M forbidden sets may be formed such that they are non-overlapping. The number of weaker users in each sector and their data requirements are typically not known a priori. Each sector may utilize as many forbidden sets for neighboring sectors as required to support its weak users. For example, sector x may utilize subbands in more forbidden sets for sector y to provide higher data rates to one or more weak users in sector x observing high interference from sector y, or to support more of these weak users. The sectors may coordinate usage of the forbidden sets.

In general, each sector may be assigned any number of unrestricted usable subband sets and any number of "constrained" subband sets. A constrained subband set may be a forbidden subband set or a limited use subband set. As an example, a sector may be assigned multiple constrained subband sets. One constrained subband set may be a forbidden subband set, and the remaining constrained subband set(s) may have different transmit power limits and may be allocated to different tiers of strong users. As another example, a sector may be assigned multiple constrained subband sets, where each constrained subband set may have a different transmit power limit (i.e., no forbidden set). The use of multiple usable and/or constrained sets for each sector may allow for better matching of subbands to weak users in different sectors.

For clarity, restrictive reuse has been specifically described for a system with 3-sector cells. In general, restrictive reuse may be used with any reuse pattern. For a K-sector/cell reuse pattern, the forbidden set for each sector/cell may be defined such that it overlaps with the forbidden set for each of the other K-1 sectors/cells, and may overlap with different combinations of other forbidden sets. Each sector/cell may form different restricted sets for different neighboring sectors based on its usable set and the forbidden sets for the neighboring sectors. Each sector/cell may then use the usable and restricted sets as described above.

Restrictive reuse has also been described for an OFDMA system. Restrictive reuse may also be used for a TDMA system, a Frequency Division Multiple Access (FDMA) system, a CDMA system, a multi-carrier CDMA system, an Orthogonal Frequency Division Multiple Access (OFDMA) system, and so on. A TDMA system uses time division multiplexing (TDM), and transmissions for different users are orthogonalized by transmitting in different time intervals. An FDMA system uses frequency division multiplexing (FDM), and transmissions for different users are orthogonalized by transmitting in different frequency channels or subbands. In general, the system resources to be reused (e.g., frequency subbands/channels, time slots, and so on) may be partitioned into usable and forbidden sets. The forbidden sets for neighboring sectors/cells overlap one another, as described above. Each sector may form restricted sets based on its usable set and the forbidden sets for neighboring sectors/cells, as described above.

Restrictive reuse may be used for a Global System for Mobile Communications (GSM) system. A GSM system may operate in one or more frequency bands. Each frequency band covers a specific range of frequencies and is divided into a number of 200 kHz radio frequency (RF) channels. Each RF channel is identified by a specific ARFCN (absolute radio frequency channel number). For example, the GSM 900 frequency band covers ARFCNs 1 through 124, the GSM 1800 frequency band covers ARFCNs 512 through 885, and the GSM 1900 frequency band covers ARFCNs 512 through 810. Conventionally, each GSM cell is assigned a set of RF channels and only transmits on the assigned RF channels. To reduce inter-cell interference, GSM cells located near each other are normally assigned different sets of RF channels such that the transmissions for neighboring cells do not interfere with one another. GSM typically employs a reuse factor greater than one (e.g., K=7 ).

Restrictive reuse may be used to improve efficiency and reduce inter-sector interference for a GSM system. The available RF channels for the GSM system may be used to form K pairs of usable and forbidden sets (e.g., K=7), and each GSM cell may be assigned one of the K set pairs. Each GSM cell may then allocate RF channels in its usable set to users in the cell and RF channels in its restricted sets to weak users. Restrictive reuse allows each GSM cell to use a larger percentage of the available RF channels, and a reuse factor closer to one may be achieved.

Restrictive reuse may also be used for a multi-carrier communication system that utilizes multiple "carriers" for data transmission. Each carrier is a sinusoidal signal that may be independently modulated with data and is associated with a particular bandwidth. One such system is a multi-carrier IS-856 system (also called 3x-DO (data-only)) that has multiple 1.23 MHz carriers. Each sector/cell in the system may be allowed to use all carriers or only a subset of the carriers. A sector/cell may be forbidden to use a given carrier to avoid causing interference on the carrier, which may allow other sectors/cells using this carrier to observe less (or no) interference, achieve higher SINR, and attain better performance. Alternatively, a sector/cell may be constrained to use a lower transmit power limit on a given carrier to reduce interference on the carrier. For each sector, the constrained (forbidden or limited use) carrier(s) may be statically or dynamically assigned.

Each sector may assign its users to its usable carrier(s). Each sector may also assign each user to a carrier in a manner to avoid strong interferers/ees for the user. For example, if multiple usable carriers are available, then a user may be assigned one of the carriers having less interference for the user (e.g., a carrier not used by a strong interferer to the user).

The processing for data transmission and reception with restrictive reuse is dependent on system design. For clarity, exemplary transmitting and receiving entities in a frequency hopping OFDMA system for the restrictive reuse embodiment with a pair of usable and forbidden subband sets for each sector are described below.

Figure 9:
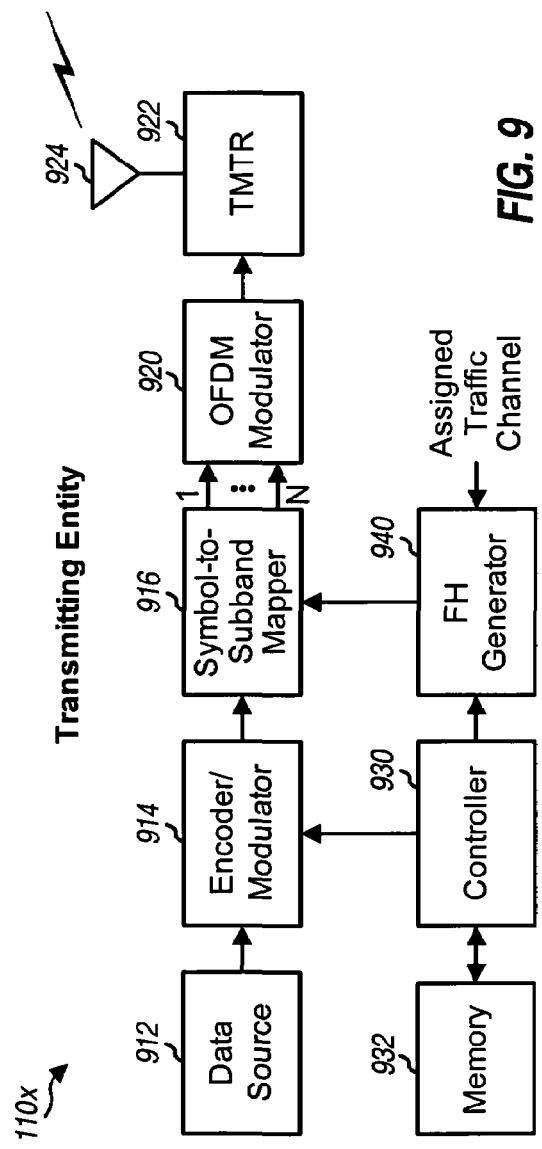
FIG. 9 shows a block diagram of a transmitting entity.

FIG. 9 shows a block diagram of an embodiment of a transmitting entity 110x, which may be the transmit portion of a base station or a terminal. Within transmitting entity 110x, an encoder/modulator 914 receives traffic/packet data from a data source 912 for a given user u, processes (e.g., encodes, interleaves, and modulates) the data based on a coding and modulation scheme selected for user u, and provides data symbols, which are modulation symbols for data. Each modulation symbol is a complex value for a point in a signal constellation for the selected modulation scheme. A symbol-to-subband mapping unit 916 provides the data symbols for user u onto the proper subbands determined by an FH control, which is generated by an FH generator 940 based on the traffic channel assigned to user u. FH generator 940 may be implemented with look-up tables, pseudo-random number (PN) generators, and so on. Mapping unit 916 also provides pilot symbols on subbands used for pilot transmission and a signal value of zero for each subband not used for pilot or data transmission. For each OFDM symbol period, mapping unit 916 provides N transmit symbols for the N total subbands, where each transmit symbol may be a data symbol, a pilot symbol, or a zero-signal value.

An OFDM modulator 920 receives N transmit symbols for each OFDM symbol period and generates a corresponding OFDM symbol. OFDM modulator 920 typically includes an inverse fast Fourier transform (IFFT) unit and a cyclic prefix generator. For each OFDM symbol period, the IFFT unit transforms the N transmit symbols to the time domain using an N-point inverse FFT to obtain a "transformed" symbol that contains N time-domain chips. Each chip is a complex value to be transmitted in one chip period. The cyclic prefix generator then repeats a portion of each transformed symbol to form an OFDM symbol that contains N+C chips, where C is the number of chips being repeated. The repeated portion is often called a cyclic prefix and is used to combat inter-symbol interference (ISI) caused by frequency selective fading. An OFDM symbol period corresponds to the duration of one OFDM symbol, which is N+C chip periods. OFDM modulator 920 provides a stream of OFDM symbols. A transmitter unit (TMTR) 922 processes (e.g., converts to analog, filters, amplifies, and frequency upconverts) the OFDM symbol stream to generate a modulated signal, which is transmitted from an antenna 924.

Controller 930 directs the operation at transmitting entity 110x. Memory unit 932 provides storage for program codes and data used by controller 930.

Figure 10:
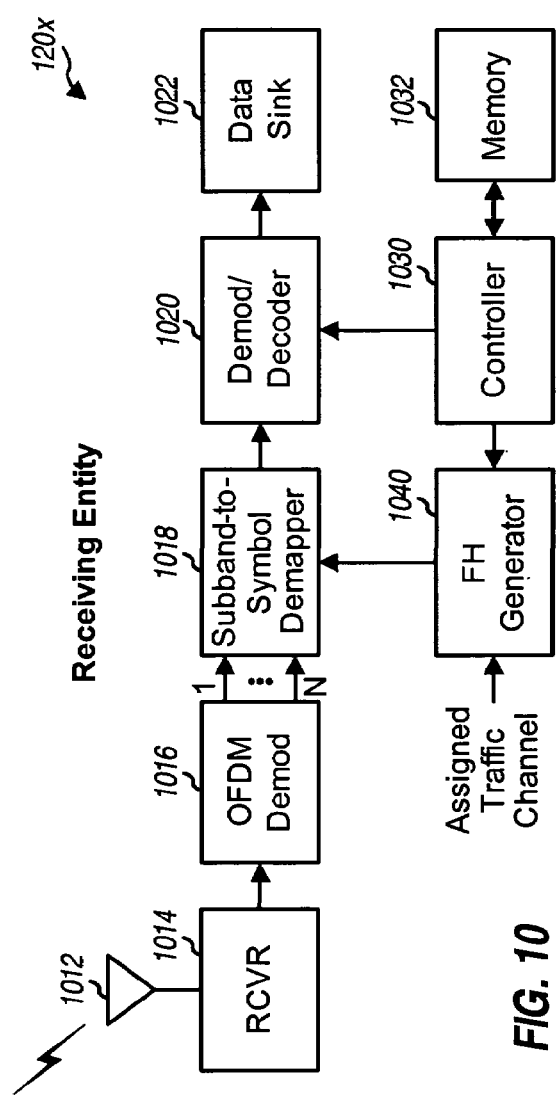
FIG. 10 shows a block diagram of a receiving entity.

FIG. 10 shows a block diagram of an embodiment of a receiving entity 120x, which may be the receive portion of a base station or a terminal. One or more modulated signals transmitted by one or more transmitting entities are received by an antenna 1012, and the received signal is provided to and processed by a receiver unit (RCVR) 1014 to obtain samples. The set of samples for one OFDM symbol period represents one received OFDM symbol. An OFDM demodulator (Demod) 1016 processes the samples and provides received symbols, which are noisy estimates of the transmit symbols sent by the transmitting entities. OFDM demodulator 1016 typically includes a cyclic prefix removal unit and an FFT unit. The cyclic prefix removal unit removes the cyclic prefix in each received OFDM symbol to obtain a received transformed symbol. The FFT unit transforms each received transformed symbol to the frequency domain with an N-point FFT to obtain N received symbols for the N subbands. A subband-to-symbol demapping unit 1018 obtains the N received symbols for each OFDM symbol period and provides received symbols for the subbands assigned to user u. These subbands are determined by an FH control generated by an FH generator 1040 based on the traffic channel assigned to user u. A demodulator/decoder 1020 processes (e.g., demodulates, deinterleaves, and decodes) the received symbols for user u and provides decoded data to a data sink 1022 for storage.

A controller 1030 directs the operation at receiving entity 120x. A memory unit 1032 provides storage for program codes and data used by controller 1030.

For restrictive reuse, each sector (or a scheduler in the system) selects users for data transmission, identifies the strong interferers/ees for the selected users, determines the usable or restricted set for each selected user based on its strong interferers/ees (if any), and allocates subbands (or assigns traffic channels) from the proper sets to the selected users. Each sector then provides each user with its assigned traffic channel, e.g., via over-the-air signaling. The transmitting and receiving entities for each user then perform the appropriate processing to transmit and receive data on the subbands indicated by the assigned traffic channel.

The restrictive reuse techniques described herein may be implemented by various means. For example, these techniques may be implemented in hardware, software, or a combination thereof. For a hardware implementation, the processing units used to identify strong interferers/ees, determine restricted sets, allocate subbands, process data for transmission or reception, and perform other functions related to restrictive reuse may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the restrictive reuse techniques may be implemented with modules (e.g., procedures, functions, and so on) that perform the functions described herein. The software codes may be stored in a memory unit (e.g., memory unit 932 in FIG. 9 or memory unit 1032 in FIG. 10) and executed by a processor (e.g., controller 930 in FIG. 9 or 1030 in FIG. 10). The memory unit may be implemented within the processor or external to the processor.

Feedback

In an embodiment, the scheduler in the base station needs CQI information from the terminal, for all re-use sets about every 5 msec, to decide on which re-use set to schedule a given terminal. This is a lot of feedback. To minimize this feedback, in the current design, the terminal feeds back a (slow) connection layer message to base station, indicating the VCQI (average CQI) for all re-use sets, once every few 100 msec. The base station then calculates the CQI for all reuse sets on a packet by packet basis, and dynamically schedules the terminal in an appropriate re-use set.

A multiple-input multiple-output (MIMO) system utilizes multiple antennas for both transmitting and receiving. An advantage of a MIMO system over a single-input single-output (SISO) system is that a MIMO system produces a "rich" multipath because the MIMO system has M antennas at the transmitter and M antennas at the receiver.

For MIMO users, the problem is that the CQI cannot be reconstructed for all re-use sets, using the current design. Solution: (1) For Multiple Code Word MIMO users, we propose a MIMO VCQI connection layer message that will enable the base station to reconstruct the MIMO-CQI for all reuse sets on a packet-by-packet basis. This will enable dynamic scheduling (restrictive reuse) gains. (2) For Single Code Word users, dynamic RESTRICTIVE REUSE can be obtained by changing the CQI reporting format, and also sending a MIMO-VCQI connection layer message. (3) For Single Code Word design, quasi-static scheduling gains can be obtained by sending a MIMO-VCQI connection layer message 2.

The CQI Value is a computed CQI value corresponding to a target sector. The number of bits is based on a CQI reporting mode and the active set size. If the active set size is 1 and the CQI reporting mode is SISO then the CQI Value is 4 bits. If the active set size is more than 1 and the CQI reporting mode is SISO the CQI Value is 3 bits. If the active set size is 1 and the CQI reporting mode is MCW-MIMO then the CQI Value is 8 bits. If the active set size is greater than 1 and the CQI reporting mode is MCW-MIMO then the CQI Value is 6 bits.

In a current design, a SISO terminal feeds-back the CQI information for a non-restrictive re-use set (111) every 5 msec. The terminal also sends a low-bandwidth VCQI (average CQI) connection layer message for all re-use sets about every few 100 msec. The base station can use this information to calculate the CQI for all reuse sets on a packet-by-packet basis and dynamically schedule users in different re-use sets to obtain RESTRICTIVE REUSE gains.

The question is whether such a scheme can also support MIMO users? If not, what can be done to enable dynamic scheduling (RESTRICTIVE REUSE gains) for MIMO users? For MIMO users, the current VCQI feedback scheme is not sufficient to obtain RESTRICTIVE REUSE gains for MIMO users.

For MIMO-Multiple-Code-Word (MIMO-MCW) users, dynamic RESTRICTIVE REUSE gains are feasible if a MIMO-VCQI connection layer message containing the VCQI for all layers and re-use sets are sent from the terminal to a base station.

For MIMO-Single-Code-Word (MIMO-SCW) users, dynamic RESTRICTIVE REUSE gains are feasible if (a) CQI feedback format is changed from a (6-bit CQI+2 bit-rank) to a (4-bit CQI for each possible rank) and (b) MIMO-VCQI connection layer message containing the VCQI for all ranks and re-use sets are sent from the terminal to a base station. The CQI format change leads to a performance loss for the (111) re-use set users, and traded-off with the RESTRICTIVE REUSE gains for (non-111) re-use set users.

For MIMO-SCW users, (quasi-static) RESTRICTIVE REUSE is attractive if the MIMO-VCQI connection layer message containing the optimum VCQI+rank for each re-use set is sent from a terminal to a base station.

MIMO-CQI Measurement
Define the following:
M: Spatial Multiplexing Layers
H(k): $M_R \times M_T$ MIMO channel matrix at tone k
P(k): $M_T \times M$ spatial mapping matrix at tone k.
$\sigma^2$: Noise+Interference power for (non-111) reuse set.
$\epsilon^2$: Noise+Interference power for (non-111) reuse set.
$E_s$: Transmit Symbol Energy.

The CQI for the (111) re-use set, assuming an M-layer transmission is computed as:

$$CQI_M(\sigma^2, E_s) = \prod_{k=1}^{N} (1 + SNR_M(k, \sigma^2, E_s))^{\frac{1}{N}} - 1 \quad (1)$$

where N is the number of OFDM tones and for an MMSE receiver, we have for the 1st layer, $$SNR_M(k, \sigma^2, E_s) = \frac{E_s}{\sigma^2 \left( \left[ P(k)^* H(k)^* H(k) P(k) + \frac{\sigma^2}{E_s} I_{M \times M} \right]^{-1} \right)_{1,1}} - 1 \quad (2)$$

For $\sigma^2 \geq \epsilon^2$, we can write the following inequalities (which will come in handy later on)

$$SNR_M(k, \epsilon^2, E_s) \leq SNR_M(k, \sigma^2, E_s) \frac{\sigma^2}{\epsilon^2} \quad (3)$$

$$CQI_M(\epsilon^2, E_s) \leq CQI_M(\sigma^2, E_s) \frac{\sigma^2}{\epsilon^2} \quad (4)$$

The equality is observed if at least one of the following conditions is satisfied:
The matrix H(k)P(k) has condition number $\kappa(H(k)P(k))=1$
$\sigma^2 = \epsilon^2$ The inequality can become a loose-inequality under the following conditions: $\sigma^2 \geq 1$ and $\epsilon^2 << \sigma^2$ and for large condition numbers, $\kappa[H(k)P(k)]$.

For SCW design, a 6-bit $$CQI_M\left(\sigma^2, \frac{M_T}{M} E_s\right)$$

and 2 bit rank (M) every 5 msec is fed back for the (111) re-use set. For MCW design, we feedback the pair [$CQI_1(\sigma^2, E_s)$, $CQI_2(\sigma^2, E_s)$] for the 1st 5 msec, and the pair [$CQI_3(\sigma^2, E_s)$, $CQI_4(\sigma^2, E_s)$] for the 2nd 5 msec, for the (111) re-use set. Each CQI is 4-bits wide.

The notation $CQI_M(\sigma^2)$ drops the dependence on "Es" term, since it is understood that the meaning of CQI is different for SCW and MCW.

In the current design, VCQI report is a connection layer message containing the average CQI (assuming 1 layer transmission) for all the re-use sets, sent every few 100 msec. We denote $VCQI_1(\epsilon^2)$ to be the 1 layer average CQI for the (non-111) reuse set and $VCQI_1(\sigma^2)$ to be the 1 layer average CQI for the (111) reuse set.

The minimum packet size for RL message is 168 bits. This puts a limitation on the size of the VCQI message. It can be calculated that the maximum number of allowed bits per re-use set for the VCQI report is 17 bits, and for RESTRICTIVE REUSE-3 (e.g. ASBR-3), the maximum number of allowed bits per re-use set for the VCQI report is 9 bits. This is because for RESTRICTIVE REUSE-3, the VCQI report should include information about 5 re-use sets, while for RESTRICTIVE REUSE-2 (e.g. ASBR-2), the VCQI report should include information about only 4 re-use sets.

Very low geometry users and very high geometry users are thermal limited, and hence achieve less RESTRICTIVE REUSE gain. For users with geometry between $VCQI_1(\sigma^2) \in [3, 20]$ dB range, 50% of users observe $VCQI_1(\epsilon^2) - VCQI_1(\sigma^2) \geq 3$ dB gain, 30% of users observe $VCQI_1(\epsilon^2) - VCQI_1(\sigma^2) \geq 5$ dB gain and 10% of users observe $VCQI_1(\epsilon^2) - VCQI_1(\sigma^2) \geq 10$ dB gain.

Figure 11:
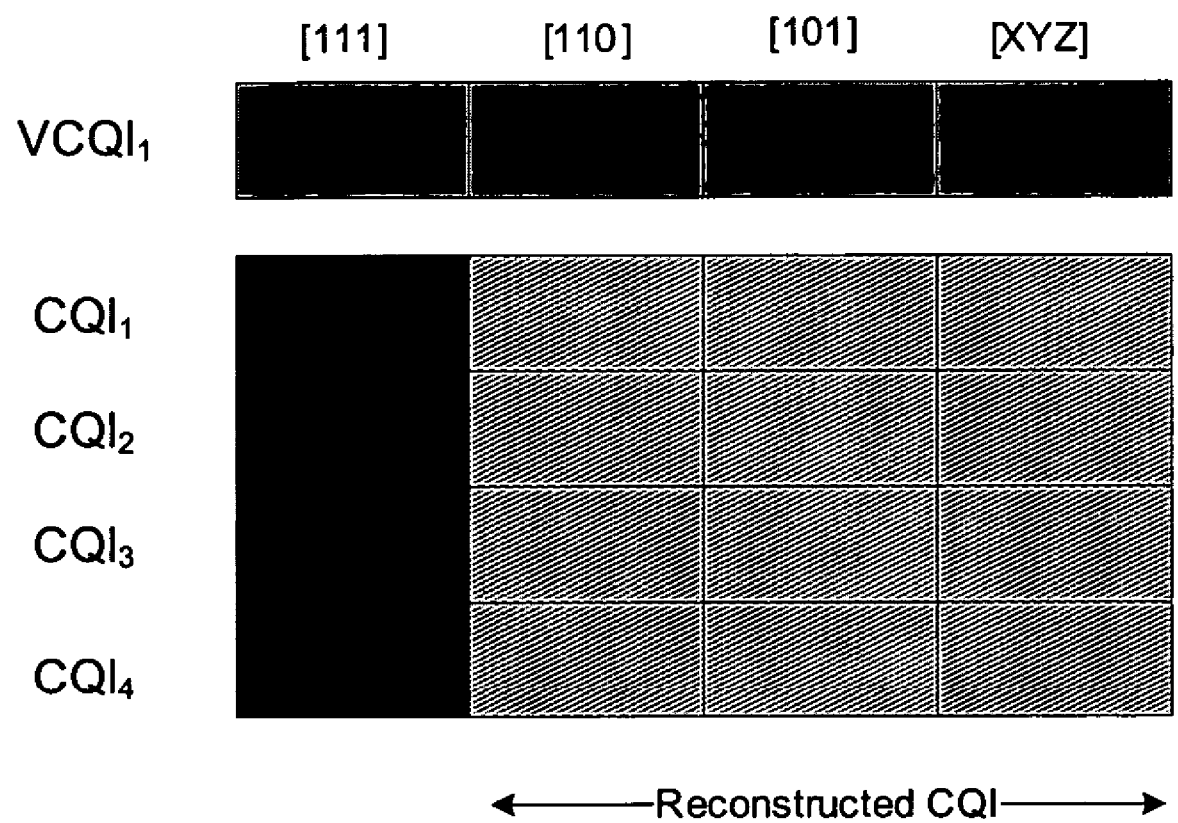
FIG. 11 shows an embodiment for the SISO-VCQI Reporting for restrictive reuse.

SISO-VCQI Reporting
FIG. 11 SISO-CSQI Reporting For RESTRICTIVE REUSE-2

We can estimate the CQI for a (non-111) reuse set as:

$$EstCQI_M(\varepsilon^2) \approx \frac{VCQI_1(\varepsilon^2)}{VCQI_1(\sigma^2)} CQI_M(\sigma^2) \approx \frac{\sigma^2}{\varepsilon^2} CQI_M(\sigma^2) \quad (5)$$

The second approximation $$\frac{VCQI_1(\varepsilon^2)}{VCQI_1(\sigma^2)} \approx \frac{\sigma^2}{\varepsilon^2}$$

comes from the fact that $$SNR_1(k, \sigma^2) = \frac{E_s}{\sigma^2} \|h(k)\|^2 \approx \frac{E_s}{\sigma^2} g^2$$

where $g^2$ is the average channel power across all receive antennas. This is a good approximation since with 4-antenna receive diversity, the channel appears flat across the frequency domain. As a result, $$CQI_M(\sigma^2) = \prod_{k=1}^{N} [1 + SNR_M(k, \sigma^2)]^{\frac{1}{N}} - 1 = \frac{E_s}{\sigma^2} g^2$$

The estimation error can be written as:

$$\Delta_M = \frac{EstCQI_M(\varepsilon^2)}{CQI_M(\varepsilon^2)} \approx \frac{CQI_M(\sigma^2)}{CQI_M(\varepsilon^2)} \frac{\sigma^2}{\varepsilon^2} \geq 1 \quad (6)$$

where the last inequality follows from inequality (4).

For MCW design, we need $\Delta_M \leq 2$ dB since the CQI granularity required for the MCW design with 7 PF is 2 dB.

We now plot the CDF of $\Delta_4$, assuming a flat-fading channel and $\sigma^2=1$, $E_s=\frac{1}{4}$, resulting in $VCQI_1(\sigma^2)=0$ dB The distribution of $\Delta_4$ is evaluated for $VCQI_1(\varepsilon^2)=\{5,10,15,20\}$ dB assuming $\Delta 4$-layer transmission.

Figure 14:
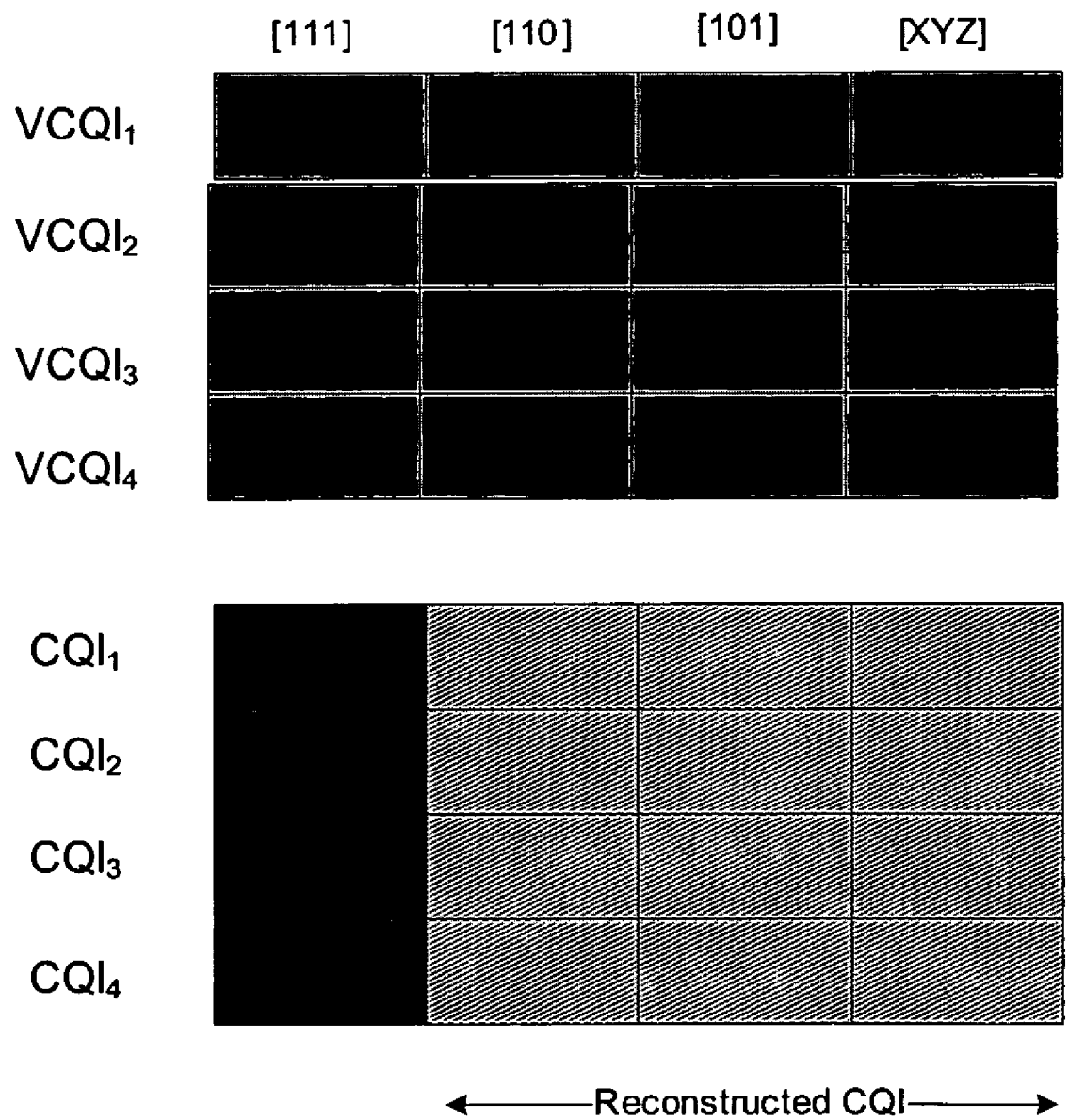
FIG. 14 shows a method for MIMO-VCQI reporting for restrictive reuse.

FIG. 14 MIMO-VCQI reporting for RESTRICTIVE REUSE-2

The $CQI_M(\varepsilon^2)$ estimates for the (non-111) re-use sets are improved by using MIMO-VCQI reporting.

Figure 12:
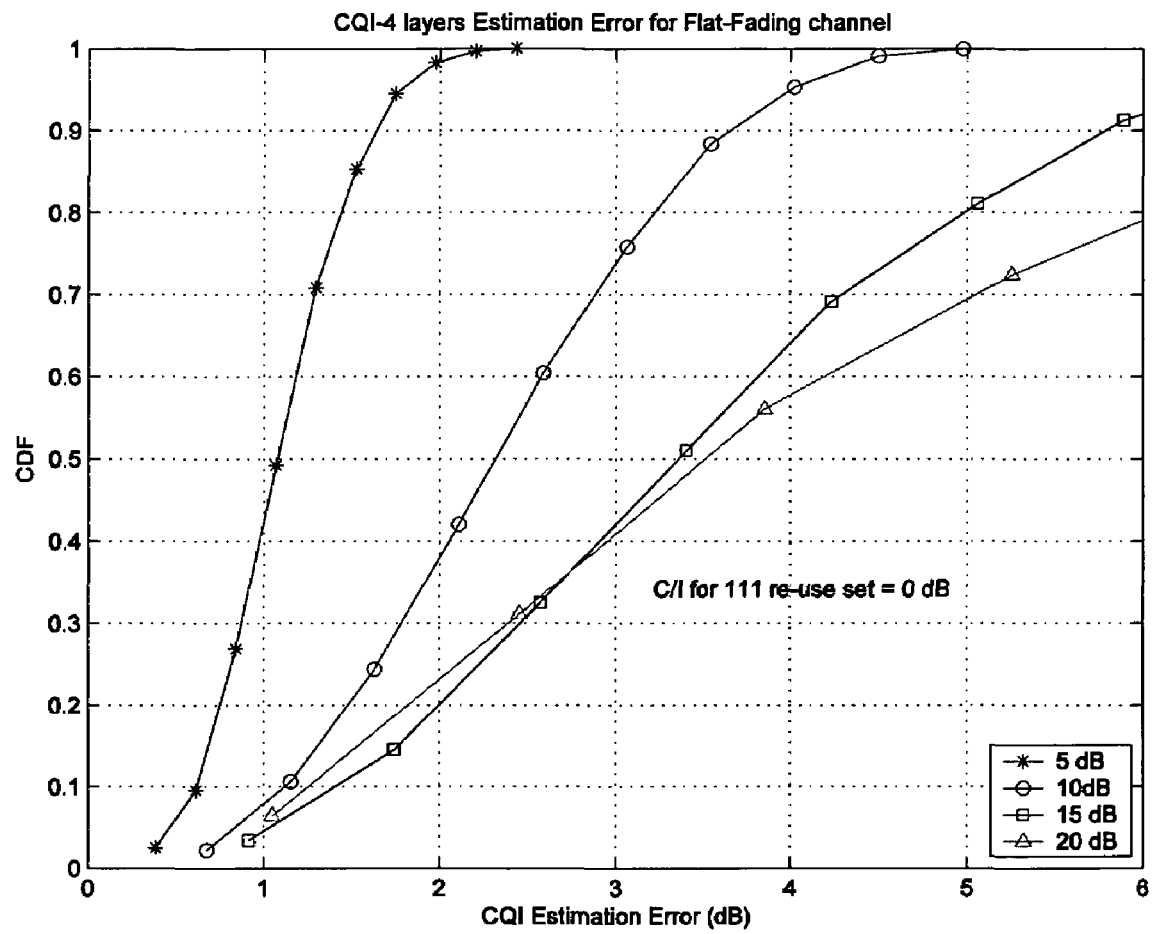
FIG. 12 illustrates an embodiment of the of the MISO-VCQI reporting for restrictive reuse.

FIG. 12 CDF for $\Delta_4$ based on $VCQI_1(\sigma^2)=0$ dB and $VCQI_1(\varepsilon^2)=\{5,10,15,20\}$ dB We see that when $VCQI_1(\varepsilon^2) \leq 5$ dB we have $\Delta \leq 2$dB for 90% of the users. However, for $VCQI_1(\varepsilon^2)>5$ dB we have $\Delta>2$ dB for a significant percentage of users. This tells us that CQI estimation of (non-111) reuse sets for $VCQI_1(\varepsilon^2)-VCQ_1(\sigma^2)>5$ dB can be un-reliable and overly aggressive. Using this CQI estimate for rate prediction will lead to aggressive PF prediction, leading to late decoder termination statistics or packet errors. Since MCW design mostly transmits 4 layers, aggressive PF prediction on layer 1 will lead to high latency decoding for other layers.

The users with $\Delta_M>2$ dB have channels with high condition numbers (ill-conditioned matrices), as seen from the scatter plot below showing the relationship between channel condition number and $\Delta_M$ for $VCQI_1(\varepsilon^2)=10$ dB and $VCQI_1(\sigma^2)=0$ dB. Our results are pessimistic since for a broadband 5 MHz channel, the condition numbers of the channel matrices should improve considerably due to multi-path. This should improve the CQI estimation performance.

Figure 13:
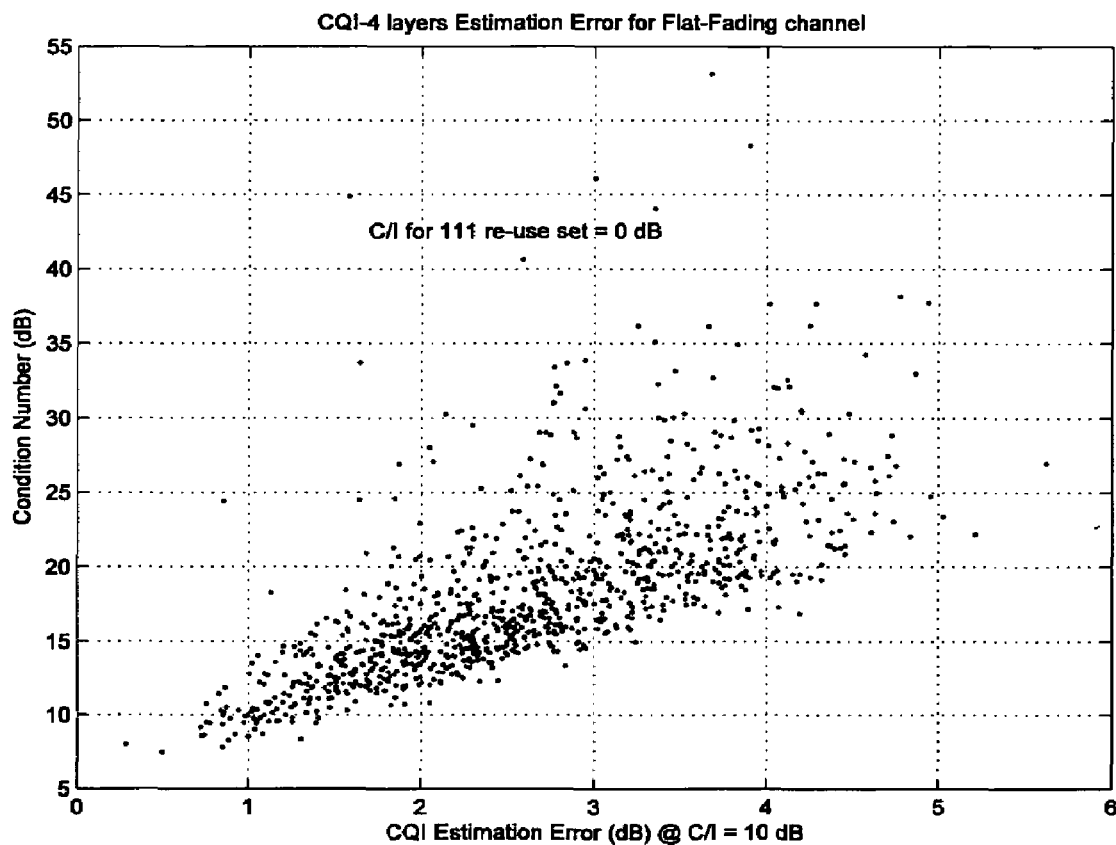
FIG. 13 shows an embodiment of Condition Number vs. CQI Estimation Error.

FIG. 13 Condition Number vs. CQI Estimation Error (□□, for $VCQI_1(\varepsilon^2)=10$ dB and $VCQI_1(\sigma^2)=0$ dB assuming a flat-fading channel.

The channel condition numbers improve progressively for 3 layers, 2 layers and 1 layer transmission, leading to progressively improved performance for these layers, as shown in the figures in the Appendix. In other words, $\Delta_1 \leq \Delta_2 \leq \Delta_3 \leq \Delta_4$.

$\Delta_4$ can be un-reliable and overly aggressive for $VCQI_1(\varepsilon^2)$ $VCQI_1(\sigma^2)>5$ dB.

$\Delta_3 \leq 2$ dB for 90% of the users for $VCQI_1(\varepsilon^2)-VCQI_1(\sigma^2)<10$ dB $\Delta_2 \leq 2$ dB for 90% of the users if $VCQI_1(\varepsilon^2)-VCQI_1(\sigma^2)<20$ dB Since $\Delta \geq 0$ dB and $\Delta$ increases with increase in eigen-value spread of the equivalent channel and $VCQI_1(\varepsilon^2)-VCQI_1(\sigma^2)$ gap, we can potentially apply a backoff $\delta(\lambda,\sigma^2,\varepsilon^2)$ to the CQI estimates.

$$EstCQI_M(\varepsilon^2) \approx \frac{\sigma^2}{\varepsilon^2} CQI_M(\sigma^2) - \delta(\lambda, \sigma^2, \varepsilon^2)$$

A coarse measure of the eigen-value spread can be obtained from the fast CQI report for layers 1,2,3 and 4. We can then potentially have a table look-up obtained via simulations, to read off the backoff values $\delta(\lambda,\sigma^2,\varepsilon^2)$. Furthermore, if the user will be scheduled in a given re-use set for multiple packets, then the back-off can be adjusted based on the decoder termination statistics of the first few packets.

FIG. 12 illustrates the MISO-VCQI reporting for RESTRICTIVE REUSE-2, which includes the average CQI for all port-sets for layers 1,2,3,4. However as before, the CQI reporting occurs only for re-use set (111).

We can estimate the M-layer CQI for a non-111 reuse set as:

$$MIMOEstCQI_M(\varepsilon^2) \approx \frac{VCQI_M(\varepsilon^2)}{VCQI_M(\sigma^2)} CQI_M(\sigma^2) \leq \quad (5)$$

$$\frac{VCQI_1(\varepsilon^2)}{VCQI_1(\sigma^2)} CQI_M(\sigma^2) = EstCQI_M(\varepsilon^2)$$

The estimation error can be written as:

$$\Delta_M^{MIMO} = \frac{MIMOEstCQI_M(\varepsilon^2)}{CQI_M(\varepsilon^2)} \leq \frac{EstCQI_M(\varepsilon^2)}{CQI_M(\varepsilon^2)} = \Delta_M$$

Figure 15:
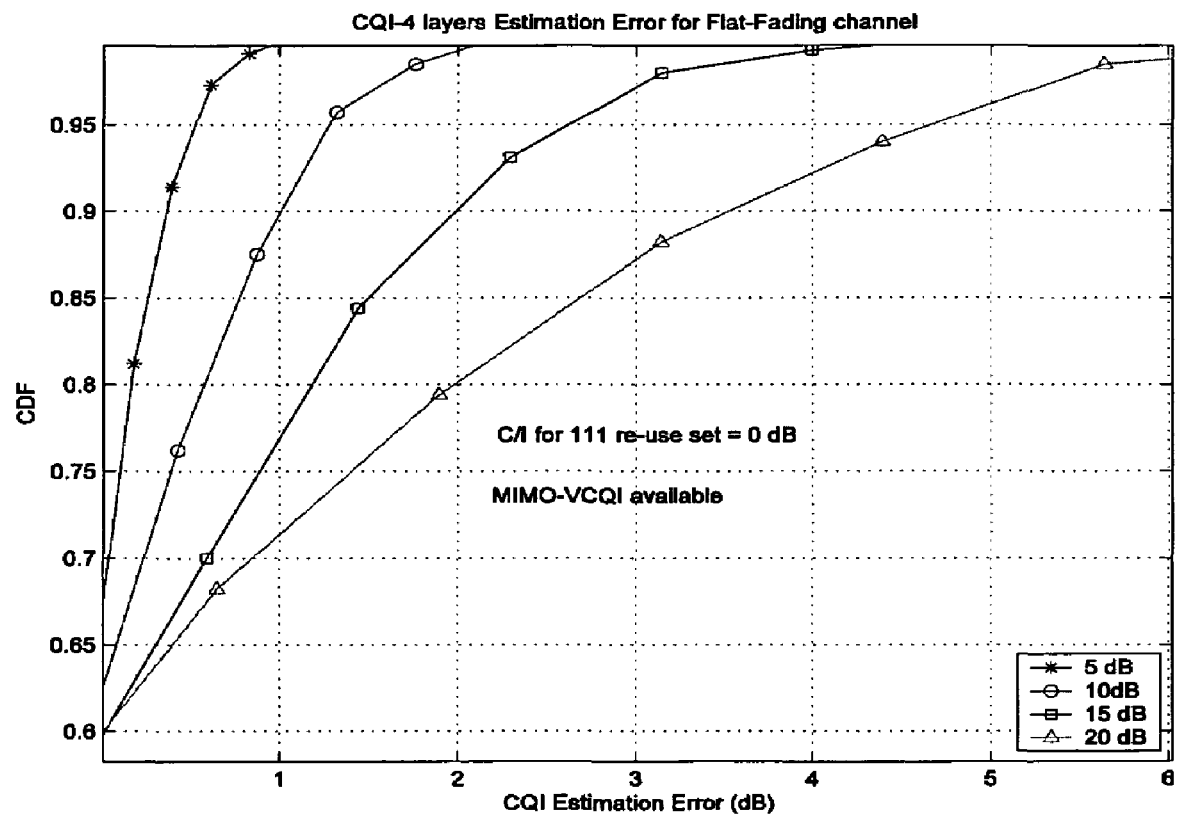
FIG. 15 illustrates CDF of MIMO for flat-fading channel.

This is hence an improvement relative to the CQI estimation error obtained using the SISO-VCQI message. We plot the CDF of $\Delta_M^{MIMO}$, assuming a flat-fading channel with $VCQI_1(\sigma^2)=0$ dB and $VCQI_1(\varepsilon^2)=\{5,10,15,20\}$ dB FIG. 15 CDF of $\Delta_4^{MIMO}$ for flat-fading channel $VCQI_1(\sigma^2)=0$ dB and $VCQI_1(\varepsilon^2)=\{5,10,15,20\}$ dB, assuming a flat-fading channel.

Figure 16:
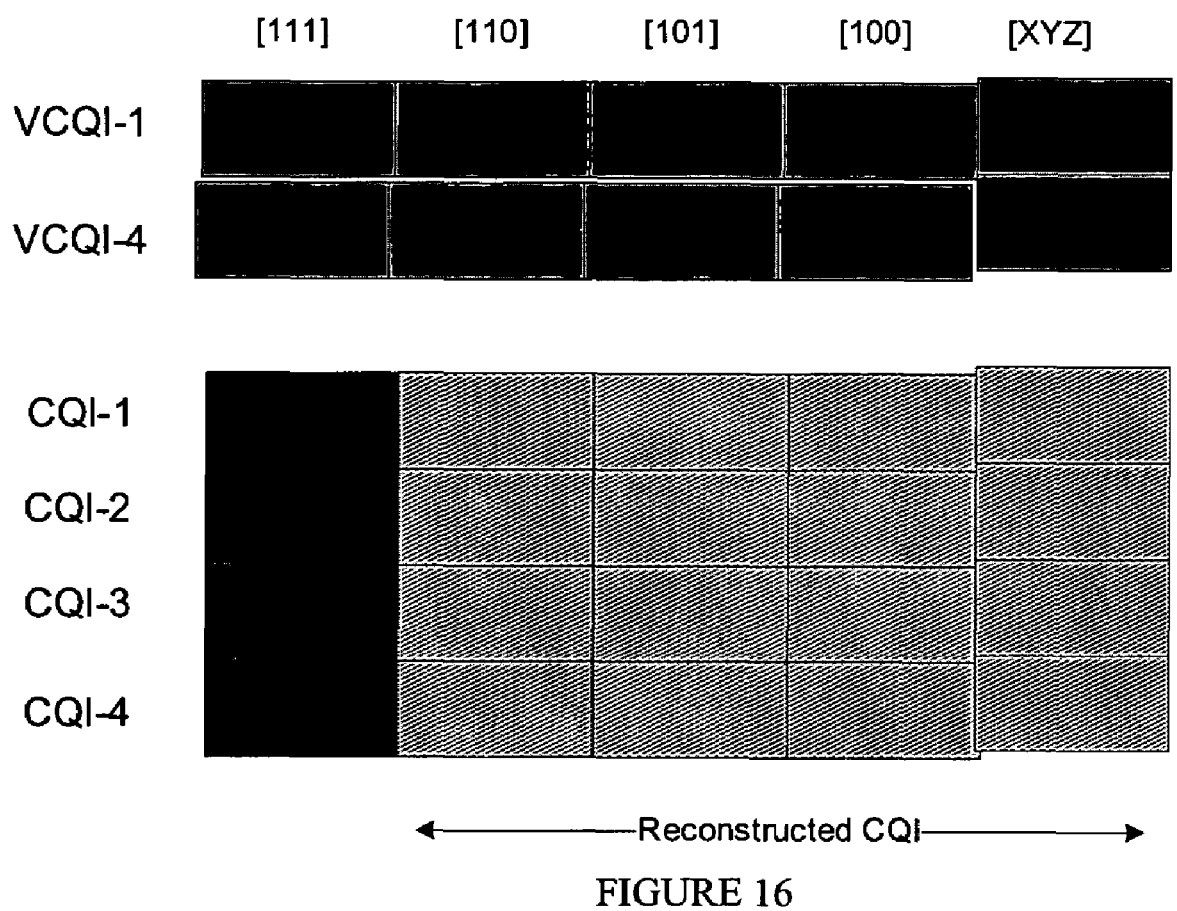
FIG. 16 shows MIMO-VCQI reporting for restrictive reuse.

We see that for $VCQI_1(\varepsilon^2) \leq 15$ dB we have $\Delta_4^{MIMO} \leq 2$ dB for 90% of the use big-improvement from the case when we used SISO-VCQI message. Since the channel condition numbers improve progressively for 3 layers, 2 layers and 1 layer transmission, we should see progressively improved performance for these layers. In other words, $\Delta_1^{MIMO} \leq \Delta_2^{MIMO} \leq \Delta_3^{MIMO} \leq \Delta_4^{MIMO}$. For M=3 layer transmission, simulation results show that we have $\Delta_3^{MIMO} \leq 2$ dB for 90% of the users even for $VCQI_1(\epsilon^2) > 20$ dB FIG. 16 MIMO-VCQI reporting for RESTRICTIVE REUSE-3

As explained before, for RESTRICTIVE REUSE-3, the maximum number of allowed bits per re-use set for the VCQI report is 9 bits. This is because for RESTRICTIVE REUSE-3, the VCQI report should include information about 5 re-use sets, while for RESTRICTIVE REUSE-2, the VCQI report should include information about only 4 re-use sets. As a result, in RESTRICTIVE REUSE-3, the VCQI message can only contain VCQI information for layers 1 and 4, due to lack of space in the VCQI message.

Dynamic RESTRICTIVE REUSE for SCW-MIMO

As explained before, in SCW design, the CQI reporting only includes a 2 bit rank (M) and a 6-bit, $CQI_M(\sigma^7)$ for the (111) reuse set. Since $CQI_R(\sigma^2)$, $R \neq M$ is not available, we cannot estimate $CQI_R(\epsilon^2)$, $R \neq M$. In other words, the drawback is that the CQI for (non-111) reuse set cannot only be estimated for other ranks. Furthermore, the CQI quantization required is 0.5 dB for SCW since we have 32 PFs. Hence, CQI estimation errors for the non-111 reuse set need to improve to minimize capacity loss due to aggressive rate prediction in the non-111 reuse set.

Based on the above observations and from the insights gained in section 2, we can say that:

Dynamic RESTRICTIVE REUSE for SCW is feasible if we can employ a MIMO-VCQI report as shown in FIG. 4. The meaning of $VCQI_M(\sigma^2)$ is different from the MCW case. In the SCW, $VCQI_M(\sigma_2)$ corresponds to the average CQI for rank M transmission, for the (111) re-use set.

The CQI reporting for the (111) re-use set, now changes to a 4-bit CQI information for each of the 4 ranks, i.e., $CQI_M(\sigma^2)$ M={1,2,3,4}, instead of a 2 bit rank (M) and a 6-bit, $CQI_M(\sigma^2)$ for the (111) reuse set. Since we only have a 4-bit CQI and not a 6-bit CQI, the drawback is that there is (a) a potential 1.5 dB performance penalty for the users remaining in the (111) re-use set due to coarse CQI feedback (4 bits instead of 6 bits), and (b) Low Doppler tolerance since CQI feedback now spans 10 msec instead of 5 msec. On the flip-side, the benefit is that rank & rate prediction can now operate at the transmitter and incorporate any power control changes.

Conclusion #2: Dynamic RESTRICTIVE REUSE gains for SCW is possible with a MIMO-VCQI reporting and a 4-bit CQI reporting for all ranks. The drawback is that the coarse quantization due to a 4-bit CQI reporting leads to performance loss for (111) re-use set users. Hence, the dynamic RESTRICTIVE REUSE gains have to be traded-off with the above performance losses, to determine if dynamic RESTRICTIVE REUSE for SCW is desirable.

Figure 17:
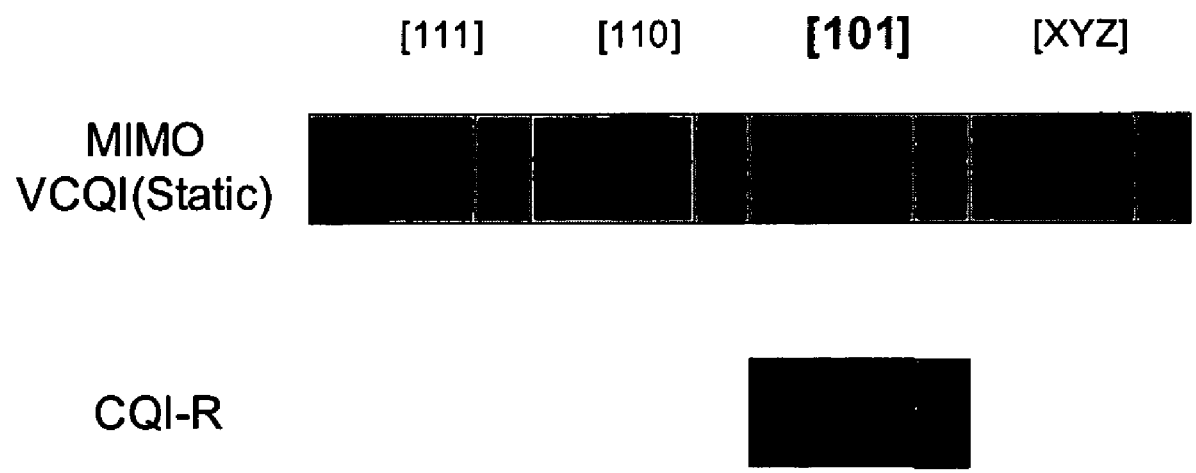
FIG. 17 illustrates the MISO-VCQI (static) reporting for static restrictive reuse and fast-CQI reporting for SCE design.

FIG. 17 illustrates the MISO-VCQI (static) reporting for static RESTRICTIVE REUSE-2, and fast-CQI reporting for SCW design. Quasi-Static RESTRICTIVE REUSE for MCW works as follows:

The MIMO-VCQI report from AT to the AP includes the 6-bit CQI+2 bit rank information for all the reuse sets.

Based on the MIMO-VCQI (static) report, the scheduler at the AP then schedules the MIMO SCW user on one of the re-use sets.

After the MIMO SCW user is allotted a specific re-use set, the 6 bit fast CQI+2 bit rank reporting occurs for this particular re-use set.

The above process can be repeated when a fresh VCQI report arrives from AT to the AP.

It would be apparent to those skilled in the art that a quality indicator other than CQI may be used and that a vectored quality indicator VCQI may be used.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing feedback to support restrictive reuse in a single code word (SCW) multiple-input multiple-output (MIMO) system, comprising:
    sending a quality indicator for a non-restrictive reuse set to a scheduler, wherein the quality indicator is based at least in part upon a direct measurement;
    sending a vectored quality indicator for all reuse sets other than the non-restrictive reuse set for all layers to a scheduler, wherein the vectored quality indicator is based at least in part upon a direct measurement; and
    scheduling a terminal in a reuse set based in part on at least one of the quality indicator or the vectored quality indicator,
    wherein the quality indicator includes two bits for rank and six bits for said quality indicator (CQI) for the non-restrictive reuse set.

2. The method of claim 1, wherein the quality indicator from the non-restrictive reuse set is sent after a first period of time and the vectored quality indicator is sent after a second period of time, the second period of time being longer than the first period of time.

3. The method of claim 1, further comprising calculating a quality indicator for all reuse sets based on the quality indicator for the non-restrichve reuse set and the vectored quality indicator.

4. The method of claim 3, further comprising scheduling tht terminal in the reuse set based on the quality indicator, the vectored quality indicator, and the quality indicator for all reuse sets.

5. The method of claim 1, wherein the quality indicator includes four bits for the CQI for each rank for the non-restrictive reuse set.

6. The method of providing feedback to support restrictive reuse in a single code word (SCW) multiple-input multiple-output (MIMO) system, comprising:
    sending a quality indicator for a reuse set with an optimum quality indicator for each layer to a scheduler, wherein the quality indicator is based at least in part upon a direct measurement;
    sending a vectored quality indicator for all reuse sets for all layers to a scheduler, wherein the vector quality indicator is based at least in part upon a direct measurement; and
    scheduling a user in a re-use set based in part on at least one of the quality indicator or the vectored quality indicator, the quality indicator includes two bits for rank and six bits for said quality indicator (CQI) for the reuse set.

7. An access terminal configured to provide feedback to support restrictive reuse in a single code word (SCW) multiple-input multiple-output (MIMO) system, corrmprising:
    a controller configured to send a quality indicator for a non-restrictive reuse set and a vectored quality indicator for all reuse sets other than the non-restrictive reuse set for all layers for scheduling a user in a re-use set, wherein the quality indicator is based at least in part upon a direct measurement and the vectored quality indicator is based at least in part upon a direct measurement; and a memory coupled to the controller, wherein the quality indicator includes two bits for rank and six bits for said quality indicator (CQI) for the non-restrictive reuse set.

8. The access terminal of claim 7, wherein controller is configured to send the quality indicator from the non-restrictive reuse set after a first period of time and the vectored quality indicator is after a second period of time, the second period of time being longer than the first period of time.

9. The access terminal of claim 7 wherein the processor is configured to calculate a quality indicator for all reuse sets based on the quality indicator for the non-restrictive reuse set and the vectored quality indicator.

10. The access terminal of claim 7 wherein the quality indicator includes four bits for the CQI for each rank for the non-restrictive reuse set.

11. An apparatus configured to provide feedback to support restrictive reuse in a single code word (SCW) multiple-input multiple-output (MIMO) system, comprising:

means for sending a quality indicator for a non-restrictive reuse set to a scheduler, wherein the quality indicator is based at least in part upon a direct measurement;

means for sending a vectored quality indicator for all reuse sets other than the non-restrictive reuse set for all layers to a scheduler, wherein the vectored quality indicator is based at least in part upon a direct measurement; and means for scheduling a user in a re-use set based in part on at least one of the quality indicator or the vectored quality indicator, wherein the quality indicator includes two bits for rank and six bits for said quality indicator (CQI) for the non-restrictive reuse set.

12. The apparatus of claim 11, wherein the quality indicator from the nonrestrictive reuse set is sent after a first period of time and the vectored quality indicator is sent after a second period of time, the second period of time being longer than the first period of time.

13. The apparatus of claim 11, further comprising calculating a quality indicator for all reuse sets based on the quaitty indicator for the non-restrictive reuse set and the vectored quality indicator.

14. The apparatus of claim 11, wherein the quality indicator includes four bits for the CQI for each rank for the non-restrictive reuse set.

\* \* \* \* \*